United States Patent
Aoki et al.

(10) Patent No.: US 6,932,738 B2
(45) Date of Patent: Aug. 23, 2005

(54) DRIVE CONTROL APPARATUS FOR HYBRID VEHICLE

(75) Inventors: Takashi Aoki, Saitama (JP); Hirokatsu Amanuma, Utsunomiya (JP); Osamu Saito, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 10/739,099

(22) Filed: Dec. 19, 2003

(65) Prior Publication Data

US 2004/0147366 A1 Jul. 29, 2004

(30) Foreign Application Priority Data

Dec. 26, 2002 (JP) .......................... 2002-376299
Jan. 28, 2003 (JP) .......................... 2003-019389

(51) Int. Cl.[7] .......................... B60K 41/02; B60K 6/02
(52) U.S. Cl. .......................................... 477/5
(58) Field of Search .............. 477/5, 175; 192/104 R, 192/3.63; 701/69

(56) References Cited

U.S. PATENT DOCUMENTS

| 4,042,056 A | * | 8/1977 | Horwinski .................. 180/65.2 |
| 6,575,870 B2 | * | 6/2003 | Kitano et al. .................. 477/3 |
| 6,661,109 B2 | * | 12/2003 | Fukasaku et al. ......... 290/40 C |
| 6,704,627 B2 | * | 3/2004 | Tatara et al. .................. 701/22 |
| 6,741,917 B2 | * | 5/2004 | Tomikawa .................... 701/69 |
| 6,832,972 B2 | * | 12/2004 | Ishikawa ..................... 475/223 |

FOREIGN PATENT DOCUMENTS

| JP | 2001-333507 | 11/2001 | ........... B60L/11/14 |
| JP | 2002-160541 | 6/2002 | ........... B60K/17/04 |

* cited by examiner

Primary Examiner—Sherry Estremsky
(74) Attorney, Agent, or Firm—Arent Fox, PLLC.

(57) ABSTRACT

When a hybrid vehicle picks up speed, the torque of a first motor is gradually reduced based on a vehicle speed before the vehicle speed reaches a vehicle speed threshold. When the vehicle speed is equal to or greater than the vehicle speed threshold, the torque of the first motor is reduced to zero. If the vehicle speed is equal to or greater than the vehicle speed threshold, then a third clutch connected to the first motor is disengaged.

22 Claims, 30 Drawing Sheets

FIG. 27

→ STEERING ANGLE θ

| 0 | | | | | | | |
|---|---|---|---|---|---|---|---|
| 1 | 2 | 4 | 5 | 6 | 7 | 9 | 10 |
| 2 | 4 | 5 | 6 | 8 | 9 | 10 | 12 |
| 4 | 5 | 6 | 8 | 9 | 10 | 12 | 13 |
| 5 | 6 | 8 | 9 | 10 | 12 | 13 | 14 |
| 6 | 8 | 9 | 10 | 12 | 13 | 14 | 16 |
| 7 | 9 | 10 | 12 | 13 | 14 | 16 | 17 |
| 9 | 10 | 12 | 13 | 14 | 16 | 17 | 19 |
| 10 | 11 | 13 | 14 | 16 | 17 | 2 | 20 |

0 at top-left

LEFT AND RIGHT WHEEL SPEED DIFFERENCE ↓

VEHICLE SPEED V →

STEERING ANGLE θ ↓

| V1 | | | | | | | V2 |
|---|---|---|---|---|---|---|---|
| 1 | 2 | 4 | 5 | 6 | 7 | 9 | 10 |
| 2 | 4 | 5 | 6 | 8 | 9 | 10 | 11 |
| 4 | 5 | 6 | 8 | 9 | 10 | 12 | 13 |
| 5 | 6 | 8 | 9 | 10 | 12 | 13 | 14 |
| 6 | 8 | 9 | 10 | 12 | 13 | 14 | 16 |
| 7 | 9 | 10 | 12 | 13 | 14 | 16 | 17 |
| 9 | 10 | 12 | 13 | 14 | 16 | 17 | 19 |
| 10 | 11 | 13 | 14 | 16 | 17 | 19 | 20 |

210

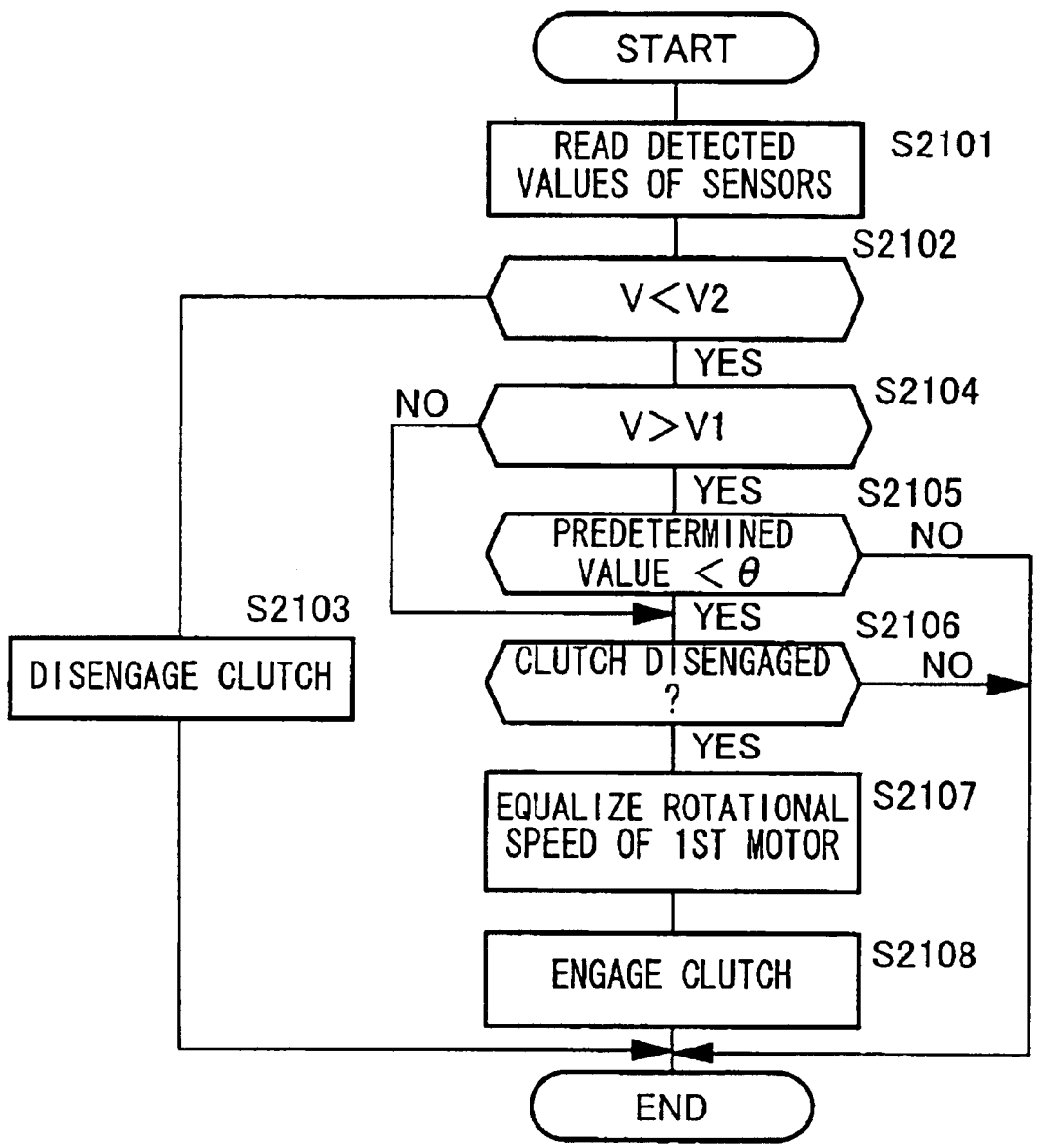

DRIVE CONTROL APPARATUS FOR HYBRID VEHICLE

BACKGROUND OF THE INVENTION

1. Field of the Invention

The present invention relates to a drive control apparatus for a hybrid vehicle whose drive shaft is rotated by an engine and an electric motor, and more particularly to a drive control apparatus for a hybrid vehicle which has a clutch disposed between an electric motor and a drive shaft, and engages and disengages the clutch depending on the state of the hybrid vehicle.

2. Description of the Related Art

In recent years, hybrid vehicles having drive wheels rotated by an internal combustion engine and an electric motor have been widely developed. The hybrid vehicle operates in various modes depending on the power source by which the hybrid vehicle runs. The various modes include a mode in which the hybrid vehicle is run by the engine alone, a mode in which the hybrid vehicle is run by the motor alone, a mode in which the output power of the engine is assisted by the motor while the hybrid vehicle is run by the engine, and a mode in which electric power is generated by an electric generator that is operated by the engine, and supplied to the motor either through a battery or directly to run the hybrid vehicle.

Various systems to drive hybrid vehicles have also been proposed. For example, one proposed four-wheel drive system drives either the front wheels or the rear wheels with an engine, or with both an engine and a motor, and drives the other wheels with the motor. Since the motor produces drive power (torque) for the hybrid vehicle, the drive power produced by the engine is reduced, and hence, lowering fuel consumption and exhaust gas emission. According to the above four-wheel drive system which drives either wheels with a motor, the drive power produced by the motor is transmitted to a drive shaft through a clutch. The motor has a speed reduction ratio that is set to a high value in order for the motor to provide high drive power. When the hybrid vehicle is running at high speed, the motor rotates at an extremely high rotational speed. Therefore, it has been proposed to disengage the clutch when the vehicle speed exceeds a predetermined level, for preventing the motor from overheating, and also for increasing the durability of the motor (see, for example, Japanese laid-open patent publication No. 2001-333507).

In the hybrid vehicle with the disengaging clutch, however, when the hybrid vehicle runs at a speed close to the predetermined level, then the clutch is frequently engaged and disengaged, thus, weakening the durability of the clutch and also making the occupants of the vehicle uncomfortable. For preventing the frequent engaging and disengaging of the clutch, it has been proposed to give hysteresis to the action of the engaging and disengaging clutch (see, for example, Japanese laid-open patent publication No. 2002-160541).

The hysteretic characteristic of the clutch is effective in reducing shocks that come from the engaging and disengaging of the clutch. Therefore, the structure of the clutch is simplified, the capacity is reduced, and the durability is increased.

When, however, the clutch is disengaged at a given vehicle speed, the motor will be generating a certain drive power, which is transmitted through the clutch to the drive shaft. Therefore, upon disengagement of the clutch, the drive power which runs the vehicle inevitably varies, also making vehicle occupants uncomfortable.

If the drive power upon the disengagement of the clutch is forcibly suppressed, it is difficult to achieve both a sufficient level of drive power and desirable hysteretic characteristics.

When the above four-wheel-drive hybrid vehicle picks up speed, the clutch is disengaged in a high speed range. The hybrid vehicle subsequently reduces its speed, or runs in a cruise mode, and the rotational speed of the motor is equalized to the rotational speed of the drive shaft, and the clutch is engaged. Since it takes some time to adjust the rotational speed, a certain time lag occurs until the motor is actually connected to the drive shaft by the clutch. Consequently, the time lag causes a delay for the motor to generate drive power, or to regenerate electric power. In order to eliminate such a delay, the clutch needs to be promptly engaged. If the clutch is engaged only by hysteresis, a range in which the motor is rotated without applying any drive power to the drive shaft widens, and the motor consumes more current and becomes less durable due to heat. Therefore, appropriated engaging of the clutch has not been proposed.

If two wheels are driven by the engine alone, it is preferable to process a control for stabilizing the vehicle when, for example, one of the drive wheels slips. When such a control process is adopted, the other wheels are driven by the motor, and hence the vehicle operates in a four-wheel-drive mode. The clutch is required to be promptly engaged in order to control the rotation of the wheels. The same problem as described above occurs when the vehicle slips.

SUMMARY OF THE INVENTION

It is an object of the present invention to provide a drive control apparatus for a hybrid vehicle having an engine and an electric motor, the drive control apparatus being capable of reducing changes in propulsive drive power and setting a timing to disengage a clutch in a high speed range when the clutch, which is disposed between the motor and a drive shaft, is disengaged, and of preventing the motor and an inverter from being overheated.

Another object of the present invention to provide a drive control apparatus for a hybrid vehicle, which is capable of appropriately setting a timing to disengage a clutch based on the state of charge stored in a battery, the temperatures of various parts in the hybrid vehicle, the amount of heat generated by a motor, the elapse of a period of time, and the result of a process for determining whether the vehicle is in a cruise mode or not, for thereby increasing the service life of the clutch, and of reducing consumption of electric power from the battery that is required to energize the motor.

Still another object of the present invention is to provide a drive control apparatus for a hybrid vehicle, which is capable of appropriately determining a range where a motor is to be rotated without applying any drive power when a clutch is engaged upon deceleration, and of appropriately determining a timing to engage the clutch for driving the vehicle with the motor or regenerating electric power with the motor.

Yet another object of the present invention is to provide a drive control apparatus for a hybrid vehicle, which is capable of appropriately determining a timing to engage the clutch based on the steering angle of a steering wheel, the vehicle speed, and the result of a process for determining whether the vehicle undergoes a slip or not, to allow the vehicle to enter a four-wheel-drive mode immediately for thereby preventing wheels from rotating idly or effectively performing various control processes for stabilizing vehicle behaviors.

According to the present invention, there is provided a drive control apparatus for a hybrid vehicle having front and rear wheels, an engine for driving one of the front and rear wheels, and a motor for driving the other of the front and rear wheels, comprising a clutch for selectively connecting and disconnecting the motor to and from a drive shaft, a torque controller for controlling the torque of the motor, a speed detector for detecting a vehicle speed of the hybrid vehicle, a clutch controller for determining a timing to engage or disengage the clutch and operating the clutch at the determined timing, wherein when the hybrid vehicle increases in speed, the torque controller gradually reduces the torque of the motor based on the vehicle speed, and the torque of the motor is reduced to zero when the vehicle speed reaches a predetermined vehicle speed threshold, and the clutch controller disengages the clutch when at least the vehicle speed reaches the vehicle speed threshold.

By thus making the torque of the motor zero before the clutch is disengaged, any change in propulsive drive power at the time the clutch is disengaged can be reduced.

The drive control apparatus may further comprise a drive circuit for energizing the motor, and a battery for supplying electric power to the motor, the vehicle speed threshold including a first vehicle speed threshold and a second vehicle speed threshold which is greater than the first vehicle speed threshold, wherein the clutch controller disengages the clutch based on the state of the motor, the drive circuit and/or the battery when the vehicle speed falls in a range between the first vehicle speed threshold and the second vehicle speed threshold, and the clutch controller disengages the clutch irrespective of the state when the vehicle speed is equal to or greater than the second vehicle speed threshold.

By thus disengaging the clutch based on the state of the motor, the drive circuit and/or the battery, it is possible to set a timing to disengage the clutch in a high speed range and prevent the motor from being overheated. The motor is reliably prevented from being overheated by setting the second vehicle speed threshold from a rated rotational speed of the motor and disengaging the clutch at the second vehicle speed threshold.

The drive control apparatus may further comprise a temperature detector for detecting the temperature of the motor, the drive circuit and/or the battery, and a timer function unit, wherein the timer function unit starts measuring time when the vehicle speed reaches the first vehicle speed threshold, the clutch controller sets a time to disengage the clutch based on the temperature of the motor, the drive circuit and/or the battery, and the vehicle speed, and disengages the clutch if the time measured by the timer function unit reaches the time to disengage the clutch.

Since the time to disengage the clutch is set based on the temperature of the motor, the drive circuit and/or the battery, and the vehicle speed, the time to disengage the clutch can flexibly be set. Even when the temperature or the vehicle speed changes, the clutch can reliably be disengaged for protecting the motor, the drive circuit and/or the battery.

The clutch controller may disengage the clutch if the hybrid vehicle is running stably when the vehicle speed falls in a range between the first vehicle speed threshold and the second vehicle speed threshold. When the clutch is disengaged, unwanted slip is reduced when the motor is de-energized at the time the hybrid vehicle is running at a high speed, resulting in improved mileage.

The hybrid vehicle is running stably if a change in the vehicle speed per a predetermined time is equal to or smaller than a predetermined value. Thus, it can simply and reliably be determined whether the hybrid vehicle is running stably or not.

The drive control apparatus may further comprise a temperature detector for detecting the temperature of the motor, the drive circuit and/or the battery, and a timer function unit, wherein the clutch controller disengages the clutch if the temperature detected by the temperature detector is equal to or greater than a predetermined temperature and continues to be equal to or greater than the predetermined temperature as detected by the timer function unit, when the vehicle speed falls in a range between the first vehicle speed threshold and the second vehicle speed threshold.

The drive control apparatus may further comprise a temperature detector for detecting the temperature of the motor, the drive circuit and/or the battery, wherein the clutch controller disengages the clutch if a rate of change of the temperature which is calculated based on a detected value of the temperature detector is equal to or greater than a predetermined threshold, when the vehicle speed falls in a range between the first vehicle speed threshold and the second vehicle speed threshold.

By thus disengaging the clutch based on the temperature of the motor, the drive circuit and/or the battery, it is possible to prevent the motor, the drive circuit and/or the battery from being overheated.

The drive control apparatus may further comprise a temperature detector for detecting the temperature of the motor, the drive circuit and/or the battery, and a cooling device for cooling the motor, the drive circuit and/or the battery when the temperature of the motor, the drive circuit and/or the battery is equal to or greater than a predetermined operation start temperature, wherein the clutch controller disengages the clutch if the temperature detected by the temperature detector is equal to or lower than a threshold temperature which is lower than the operation start temperature, when the vehicle speed falls in a range between the first vehicle speed threshold and the second vehicle speed threshold.

The clutch controller may calculate an amount of heat generated by the motor and disengages the clutch if an accumulative sum of the amount of heat reaches a predetermined amount-of-heat threshold, when the vehicle speed falls in a range between the first vehicle speed threshold and the second vehicle speed threshold.

The temperature detector is unnecessary by thus calculating the amount of heat generated by the motor.

The drive control apparatus may further comprise a state-of-charge detector for detecting state of charge of the battery, wherein the clutch controller disengages the clutch if the state of charge is equal to or smaller than a first state-of-charge threshold or equal to or greater than a second state-of-charge threshold which is greater than the first state-of-charge threshold, when the vehicle speed falls in a range between the first vehicle speed threshold and the second vehicle speed threshold.

The drive control apparatus may further comprise a state-of-charge detector for detecting state of charge of the battery, wherein the clutch controller disengages the clutch if a rate of change of the state of charge is equal to or greater than a predetermined threshold, when the vehicle speed falls in a range between the first vehicle speed threshold and the second vehicle speed threshold.

The battery is prevented from being excessively charged by disengaging the clutch based on the state of charge of the battery.

The clutch controller may calculate a time in which the vehicle speed is equal to or greater than the first vehicle speed threshold and disengages the clutch if the time reaches a predetermined time threshold, when the vehicle speed falls in a range between the first vehicle speed threshold and the second vehicle speed threshold.

The clutch is thus disengaged based on the predetermined time threshold. The clutch can reliably be disengaged even if other conditions are not satisfied.

The above conditions for disengaging the clutch may be used independently, or in combinations.

The drive control apparatus may further comprise a deceleration detector for detecting a deceleration of the hybrid vehicle, wherein the clutch controller engages the clutch if the deceleration is greater than a predetermined deceleration threshold while the clutch is being disengaged.

The drive control apparatus may further comprise a shifting action detector for detecting a shifting action of a transmission mounted on the hybrid vehicle, wherein the clutch controller engages the clutch if the shifting action detector detects a shift-down action while the clutch is being disengaged.

The drive control apparatus may further comprise a deceleration detector for detecting a deceleration of the hybrid vehicle, and a timer function unit, wherein the timer function unit starts measuring time when the speed detector detects the hybrid vehicle as being decelerated while the clutch is being disengaged, the timer function unit updates a time to engage the clutch based on the vehicle speed and/or the deceleration while the hybrid vehicle is being decelerated, and the clutch controller engages the clutch if the time measured by the timer function unit reaches the time to engage the clutch.

The drive control apparatus may further comprise a deceleration detector for detecting a deceleration of the hybrid vehicle, and a timer function unit, wherein the clutch controller sets a time to engage the clutch based on the vehicle speed and/or the deceleration while the clutch is being disengaged, the timer function unit starts measuring time when the deceleration is equal to or greater than a predetermined value, and the clutch controller engages the clutch if the time measured by the timer function unit reaches the time to engage the clutch or the deceleration is equal to or greater than the predetermined value.

By thus engaging the clutch based on the deceleration, a time-up event detected by the timer function unit, and/or a shift-down action, a range where the motor is rotated idly without applying any drive power is reduced, and the motor can immediately generate drive power or regenerate electric power.

The drive control apparatus may further comprise a slip determining unit for judging that a wheel is slipping or likely to slip, wherein the clutch controller engages the clutch if the slip determining unit judges that the wheel is slipping or likely to slip while the clutch is being disengaged.

The stability of the hybrid vehicle as it runs can be increased by engaging the clutch based on the detection of a slip.

The clutch controller may engage the clutch if the vehicle speed becomes lower than the vehicle speed threshold while the clutch is being disengaged.

The slip determining unit may judge that the wheel is slipping or likely to slip, based on the difference between wheel speeds of the front and rear wheels.

The slip determining unit may judge that the wheel is slipping or likely to slip, based on the difference between wheel speeds of left and right front wheels, or left and right rear wheels.

The drive control apparatus may further comprise a steering wheel detector for detecting a steering angle of a steering wheel of the hybrid vehicle, wherein the slip determining unit judges that the wheel is slipping or likely to slip, based on the vehicle speed and the steering angle.

The drive control apparatus may further comprise a steering wheel detector for detecting a steering angle of a steering wheel of the hybrid vehicle, wherein the slip determining unit judges that the wheel is slipping or likely to slip, based on the difference between wheel speeds of left and right front wheels, or left and right rear wheels, and the steering angle.

The above conditions for disengaging the clutch may be used independently, or in combinations.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 27 is a diagram showing the contents of a map where indexes for the possibility of a wheel turn are recorded;

FIG. 29 is a diagram showing the contents of a map where indexes for the possibility of a vehicle behavior disturbance are recorded; and FIG. 30 is a flowchart of a processing sequence of the drive control apparatus according to a twentieth program.

DESCRIPTION OF THE PREFERRED EMBODIMENTS

Drive control apparatus for hybrid vehicles according to preferred embodiments of the present invention will be described below with reference to FIGS. 1 through 30. A drive control apparatus 10 (see FIG. 2) according to an embodiment of the present invention is incorporated in a hybrid vehicle 12 (see FIG. 1).

Figure 1:
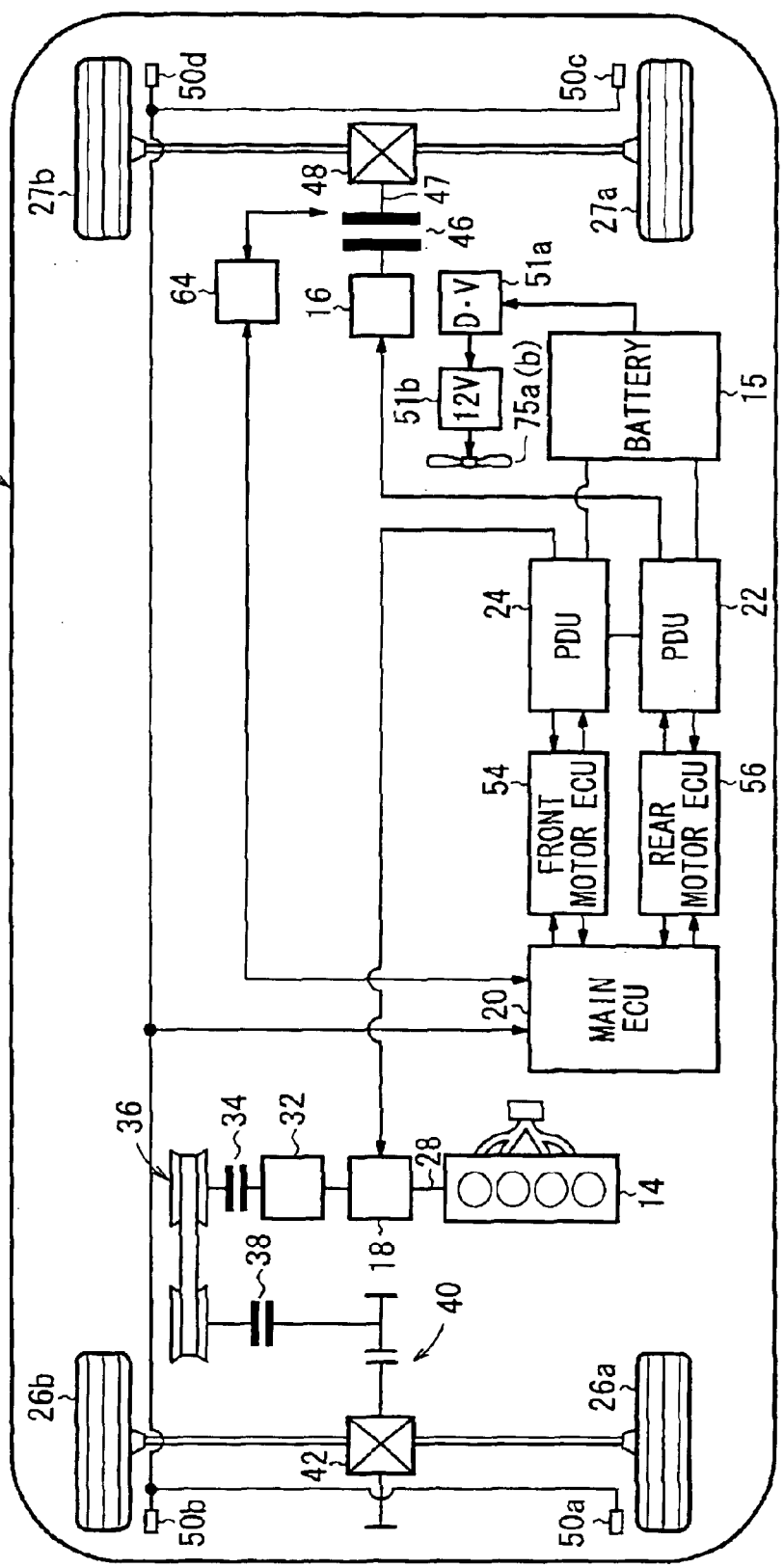
FIG. 1 is a block diagram of a drive system of a hybrid vehicle.

As shown in FIG. 1, the hybrid vehicle 12 is a four-wheel-drive vehicle and has an internal combustion engine 14, a first motor 16 energized by electric power supplied from a battery 15, a second motor 18, and a main ECU (clutch controller, Electronic Control Unit) 20 for intensively managing and controlling the engine 14, the first motor 16, the second motor 18, etc. The main ECU 20 comprises a microcomputer (not shown) made of a RAM (Random Access Memory), a ROM (Read Only Memory), a CPU (Central Processing Unit), an input/output interface, a timer, and other components. The main ECU 20 performs its processing operation according to programs, maps, data, etc. that are stored in the ROM. The main ECU 20 performs different operations based on program modifications.

The hybrid vehicle 12 also has first and second PDUs (Power Drive Units) 22, 24 for controlling electric power supplied to the first and second motors 16, 18, respectively, two front wheels 26a, 26b that can be driven by the engine 14 and the second motor 18, and two rear wheels 27a, 27b that can be driven by the first motor 16. The first PDU 22 and the second PDU 24 have functions to detect the value of currents that are supplied to the first motor 16 and the second motor 18, respectively.

The engine 14 and the second motor 18 are connected to a common drive shaft 28, and drive the front wheels 26a, 26b through an oil pump 32, a first clutch 34, a belt-and-pulley mechanism 36, a second clutch 38, a gear mechanism 40, and a first differential gear 42. The first motor 16 drives the rear wheels 27a, 27b through a third clutch 46, a drive shaft 47, and a second differential gear 48. The first clutch 34 and the second clutch 38 may be replaced with a vehicle starting clutch or a forward/reverse selector clutch.

The first motor 16 and the second motor 18 also operate as generators under the control of the first PDU 22 and the second PDU 24. Specifically, the second motor 18 can be rotated by drive power (torque) supplied from the engine 14 or the front wheels 26a, 26b to generate electric power, which is stored in the battery 15. The first motor 16 can be rotated by drive power (torque) supplied from the rear wheels 27a, 27b to regenerate electric power, which is stored in the battery 15.

The front wheels 26a, 26b and the rear wheels 27a, 27b are provided with vehicle speed sensors 50a, 50b, 50c, 50d which are connected to the main ECU 20 for detecting a vehicle speed V. The vehicle speed sensors 50a, 50b detect wheel speeds of the left and right front wheels 26a, 26b, and the vehicle speed sensors 50c, 50d detect wheel speeds of the left and right rear wheels 27a, 27b. The main ECU 20 calculates the vehicle speed V based on the wheel speeds of the front wheels 26a, 26b and the rear wheels 27a, 27b.

The voltage of the battery 15 is lowered by a downverter (D·V) 51a to a voltage of 12 V that is supplied through a 12V power supply controller 51b to fans (cooling devices) 75a, 75b.

Figure 2:
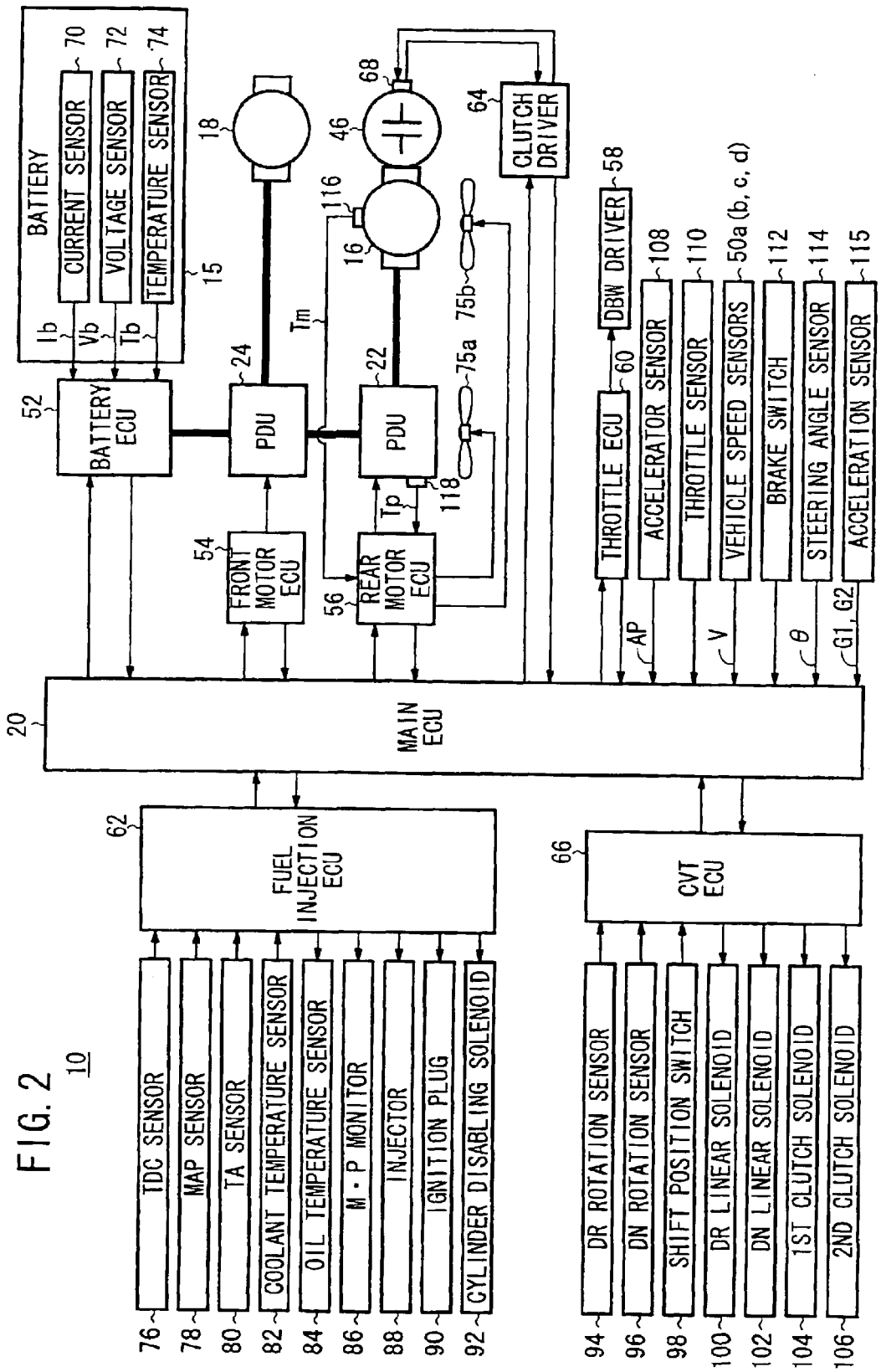
FIG. 2 is a block diagram of a drive control apparatus for the hybrid vehicle according to the present invention.

As shown in FIG. 2, the drive control apparatus 10 includes the main ECU 20, and has a battery ECU (state-of-charge detector) 52 for controlling the battery 15, a front motor ECU 54 for controlling the second motor 18 through the second PDU 24, a rear motor ECU (drive power controller) 56 for controlling the first motor 16 through the first PDU 22, a throttle ECU 60 for controlling a throttle valve opening of the engine 14 through a DBW (Drive By Wire) driver 58, a fuel injection ECU 62 for controlling an injected amount of fuel, a clutch driver 64 for engaging and disengaging the third clutch 46, and a continuously variable transmission (CVT) ECU 66 for controlling the belt-and-pulley mechanism 36. A clutch switch 68 for detecting the engagement and disengagement of the third clutch 46, is mounted on the third clutch 46, and is connected to the clutch driver 64.

The battery ECU 52 is connected to three sensors, a current sensor 70, a voltage sensor 72, and a temperature sensor 74, associated with the battery 15. The current sensor 70 measures a current Ib that charges and discharges the battery 15. The voltage sensor 72 measures a voltage Vb of the cell chamber of the battery 15. The temperature sensor 74 measures a temperature Tb in the cell chamber of the battery 15.

The battery ECU 52 calculates state of charge (SOC) of the battery 15 based on the voltage value of the battery 15 or the integrated value of electrical energy charged in, and discharged from the battery 15. The state of charge is represented by a value in the range from 0 to 100%. When the state of charge is 0%, the battery 15 is in a fully discharged state or an uncharged state. When the state of charge is 100%, the battery 15 is in a rated charged state.

The fans 75a, 75b are positioned near the first motor 16 and the first PDU 22, respectively. The fans 75a, 75b are rotated by the rear motor ECU 56 when the temperature is a predetermined operation starting temperature Tf or higher.

To the fuel injection ECU 62, there are connected a TDC (Top Dead Center) sensor 76 for detecting a camshaft rotational angle, a MAP sensor 78 for detecting an intake air pressure, a TA (Temperature of Air) sensor 80 for detecting an intake air temperature, a coolant temperature sensor 82 for detecting an engine coolant temperature, an oil temperature sensor 84 for detecting an engine oil temperature, and an M·P (Master Power) monitor 86 for detecting a brake master power negative pressure. To the fuel injection ECU 62, there are also connected an injector 88 serving as a fuel injection actuator for each of the cylinders of the engine 14, an ignition plug 90 serving as a fuel ignition actuator for each of the cylinders of the engine 14, and a cylinder disabling solenoid 92 for selectively disabling cylinders of the engine 14.

To the continuously variable transmission ECU 66, there are connected a DR rotation sensor 94 for detecting a drive pulley rotational speed of the belt-and-pulley mechanism 36, a DN rotation sensor 96 for detecting a driven pulley rotational speed of the belt-and-pulley mechanism 36, and a shift position switch (shifting action detector) 98 for detecting a shift lever position. To the continuously variable transmission ECU 66, there are also connected a DR linear solenoid 100 for positioning a drive pulley of the belt-and-pulley mechanism 36, a DN linear solenoid 102 for positioning a driven pulley of the belt-and-pulley mechanism 36, a first clutch solenoid 104 for engaging and disengaging the first clutch 34, and a second clutch solenoid 106 for engaging and disengaging the second clutch 38.

To the main ECU 20, there are connected an accelerator sensor 108 for detecting the displacement AP of the accelerator pedal of the hybrid vehicle 12, a throttle sensor 110 for detecting a throttle valve opening, the vehicle speed sensors 50a through 50d, a brake switch 112 for detecting when the brake system of the hybrid vehicle 12 is turned on and off, a steering angle sensor 114 for detecting the steering angle θ of the steering wheel of the hybrid vehicle 12, and an acceleration sensor (deceleration detector) 115 which can detect an acceleration or deceleration of the hybrid vehicle 12 in the direction of travel.

The first motor 16 is provided with a motor temperature sensor 116 for detecting the temperature Tm. The first PDU 22 is provided with a PDU temperature sensor 118 for detecting the temperature Tp. The motor temperature sensor 116 and the PDU temperature sensor 118 are connected to the rear motor ECU 56.

The motor temperature sensor 116, the PDU temperature sensor 118, and the temperature sensor 74 may be located in thermally weakest regions or positions where the temperatures of the thermally weakest regions can be estimated. For example, the motor temperature sensor 116 may detect the temperature of windings of the first motor 16, and the PDU temperature sensor 118 may comprise an on-chip sensor of a semiconductor device. Temperature data produced as detected results from the motor temperature sensor 116 and the PDU temperature sensor 118 are also supplied to the main ECU 20.

Figure 3:
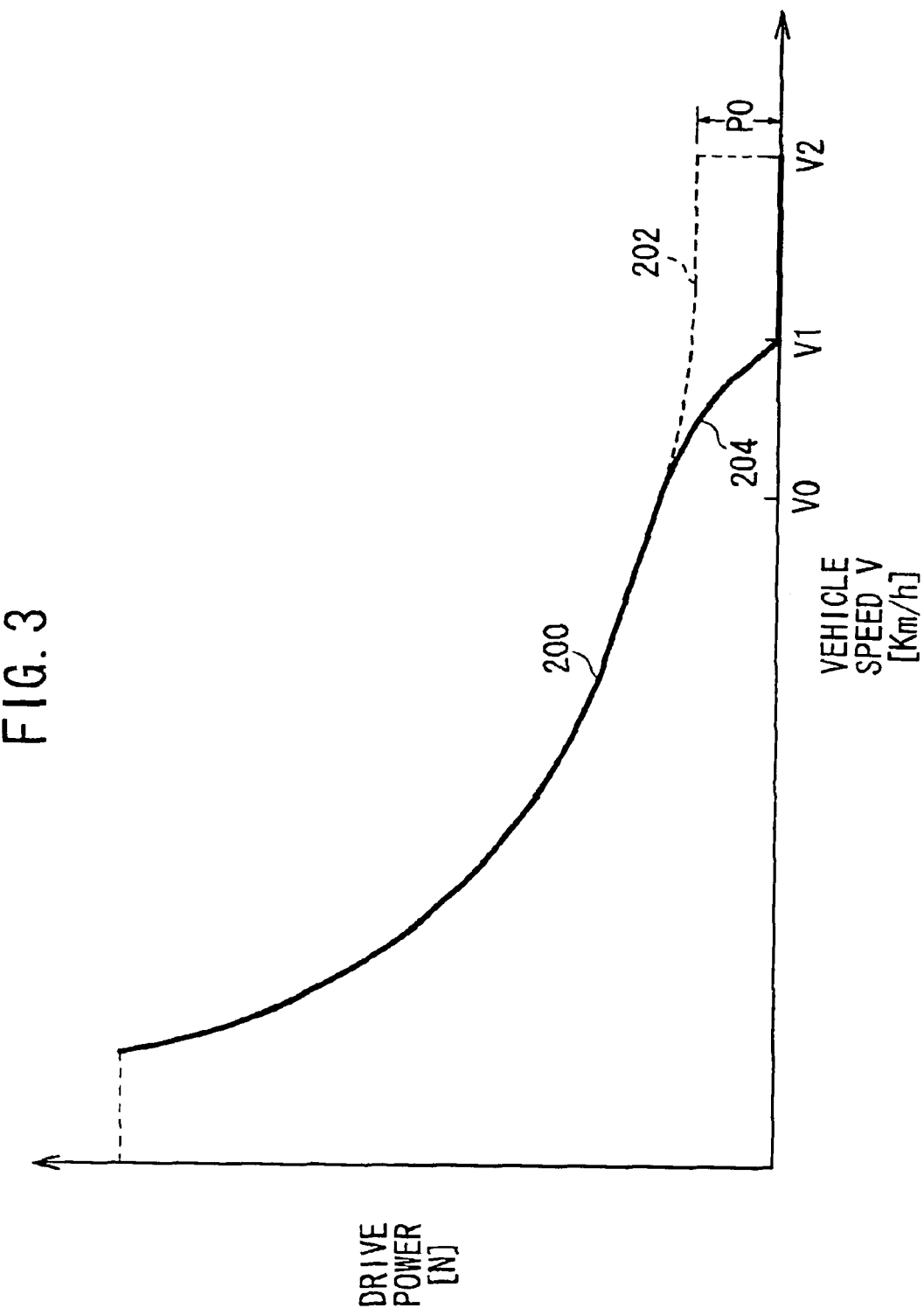
FIG. 3 is a graph showing drive power generated by a motor for various vehicle speeds.

As indicated by motor characteristic curves 200, 202 in FIG. 3, the drive power generated by the first motor 16 is substantially inversely proportional to the vehicle speed V. In view of the heating, durability, and power consumption of the first motor 16, the third clutch 46 is disengaged when the vehicle speed V is equal to or higher than a speed threshold (second vehicle speed threshold) V2. At this time, the first motor 16 can still generate a relatively small drive power P0. The vehicle speed threshold V2 is established based on the rated rotational speed of the first motor 16.

Operation of the drive control apparatus 10 as constructed above will be described below.

First, a processing sequence that is executed by the main ECU 20 based on a first program stored in the ROM will be described below with reference to FIG. 4. The first program, and second through twentieth programs described later on, are stored in the ROM, and are repeatedly executed by the CPU during a predetermined fraction of time. The first through eighth programs serve to control a timing to disengage the third clutch 46. The ninth through twentieth programs are executed after the third clutch 46 is disengaged, and serve to control a timing to engage the third clutch 46.

Other processing sequences, for example, processing sequences to engage and disengage the first clutch 34 and the second clutch 38, are executed based on other programs.

Figure 4:
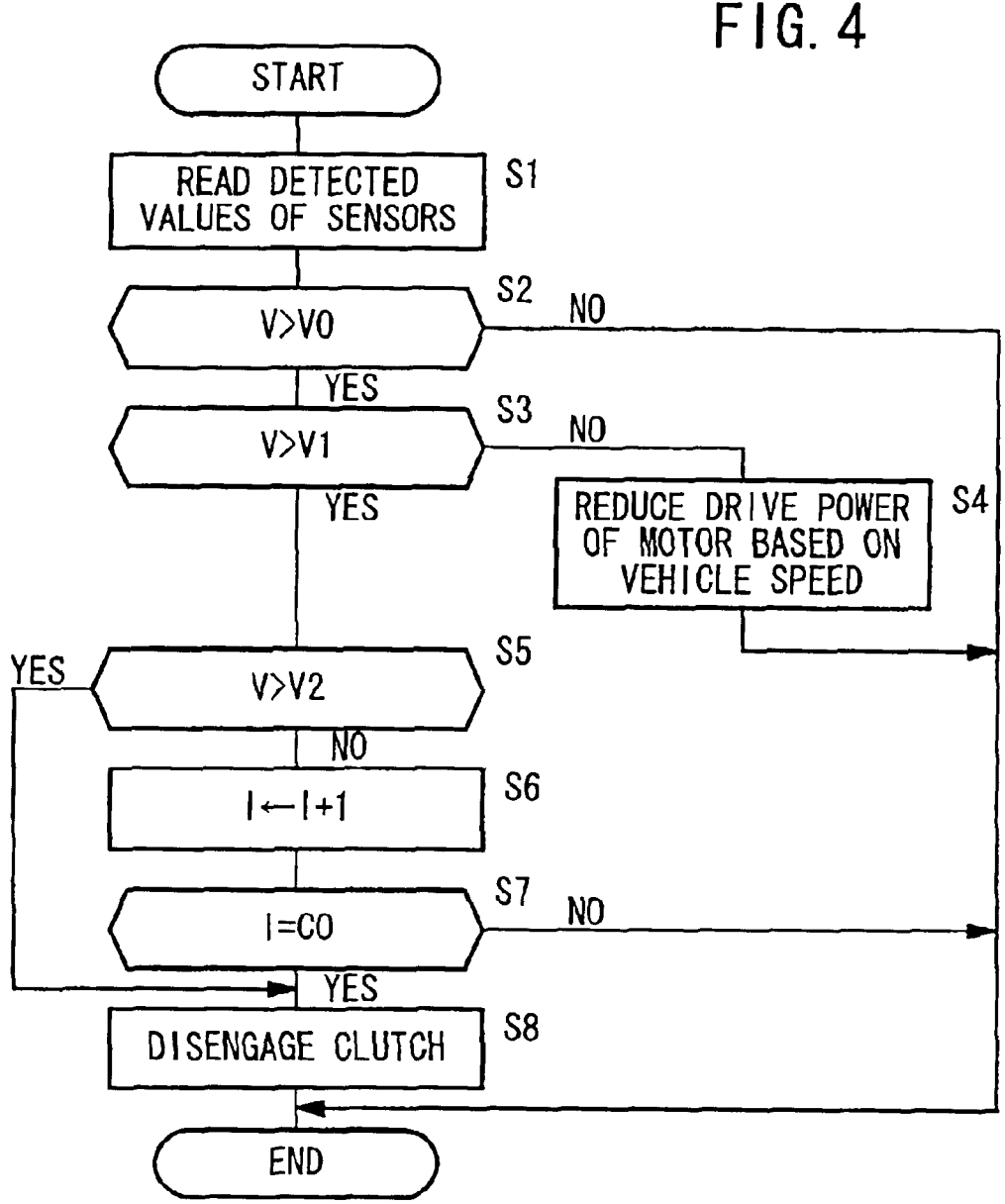
FIG. 4 is a flowchart of a processing sequence of the drive control apparatus according to a first program.

As shown in FIG. 4, the main ECU 20 reads detected values from the various sensors that are connected to the main ECU 20, and also reads other various data in step S1. Specifically, the ECU 20 reads detected values of the sensors and switches including the vehicle speed sensors 50a through 50d, the accelerator sensor 108, the steering angle sensor 114, the acceleration sensor 115, and the shift position switch 98, and also reads data representing the state of charge, the temperature Tm of the first motor 16, the temperature Tp of the first PDU 22, and the temperature Tb of the battery 15.

In step S2, the main ECU 20 compares the vehicle speed V with a predetermined vehicle speed threshold V0 (see FIG. 3). If the vehicle speed V is smaller than the vehicle speed threshold V0, then the main EPU 20 puts the processing sequence to an end. If the vehicle speed V is greater than the vehicle speed threshold V0, then control goes to next step S3. The vehicle speed threshold V0 is established as a vehicle speed that is relatively close to, but smaller than, the vehicle speed threshold V2 (V0<V2).

In step S3, the main ECU 20 compares the vehicle speed V with a predetermined vehicle speed threshold V1 (first vehicle speed threshold, V0<V1<V2). If the vehicle speed V is smaller than the vehicle speed threshold V1, then control goes to step S4 (drive power controller). If the vehicle speed V is greater than the vehicle speed threshold V1, then control goes to step S5. The vehicle speed threshold V1 is established as a vehicle speed between the vehicle speed threshold V0 and the vehicle speed threshold V2, and is relatively close to the vehicle speed threshold V0.

In step S4 (when the vehicle speed V falls in a range between the vehicle speed threshold V0 and the vehicle speed threshold V1), the main ECU 20 reduces the drive power generated by the first motor 16 below the motor characteristic curve 202 (see FIG. 3) based on the vehicle speed V. Specifically, the main ECU 20 reduces the drive power generated by the first motor 16 along a drive power curve 204 lower than the motor characteristic curve 202. The drive power curve 204 is established such that it agrees with the motor characteristic curve 202 when the vehicle speed V is equal to the vehicle speed threshold V0 and the drive power is "0" when the vehicle speed V is equal to the vehicle speed threshold V1. According to the drive power curve 204, the drive power generated by the first motor 16 is gradually reduced from the vehicle speed threshold V0 toward the vehicle speed threshold V1. The drive power curve 204 is smoothly connected to the motor characteristic curve 200.

In step S4, the main ECU 20 initializes a timer counter (timer function unit) I to 0.

After the drive power generated by the first motor 16 is set in step S4, the main ECU 20 supplies the data of the drive power setting to the rear motor ECU 56, enabling the rear motor ECU 56 to control the first motor 16. Thereafter, the main EPU 20 puts the processing sequence to an end.

In step S5, the main ECU 20 compares the vehicle speed V with the vehicle speed threshold V2. If the vehicle speed V is greater than the vehicle speed threshold V2, then control goes to step S8. If the vehicle speed V is smaller than the vehicle speed threshold V2, then control goes to step S6.

In step S6 (when the vehicle speed V falls in a range between the vehicle speed threshold V1 and the vehicle speed threshold V2), the main ECU 20 counts up the timer counter I (I←I+1).

Then, in step S7, the main ECU 20 compares the value of the timer counter I with a predetermined time threshold C0. If the value of the timer counter I is smaller than the time threshold C0, then the main EPU 20 puts the processing sequence to an end. If the value of the timer counter I is equal to the time threshold C0, then control goes to step S8.

The time threshold C0 is set to an appropriate time for preventing the third clutch 46 from being engaged for a long period of time, and also preventing the third clutch 46 from being frequently engaged and disengaged after the vehicle speed V has reached the vehicle speed threshold V1. The counting up and comparing processes in steps S6, S7 are timer processes, and may be interrupted by another suitable timer rather than the program.

In step S8, the main ECU 20 supplies a command to the clutch driver 64 to disengage the third clutch 46. Based on the supplied command, the clutch driver 64 disengages the third clutch 46 and confirms the disengagement of the third clutch 46 with a signal from the clutch switch 68.

During step S8, since the drive power generated by the first motor 16 is "0", the propulsive drive power remains unchanged even when the third clutch 46 is disengaged, and hence vehicle occupants do not feel uncomfortable. Inasmuch as the drive power transmitted by the third clutch 46 is "0", no slip occurs in the third clutch 46 when the third clutch 46 is disengaged, and hence the durability and the service life of the third clutch 46 is increased. Because step S8 is necessarily executed when the vehicle speed V is greater than the vehicle speed threshold V2, the first motor 16 is reliably prevented from being overheated.

By executing the first program, the drive control apparatus 10 disengages the third clutch 46 upon elapse of the time represented by the time threshold C0 after the vehicle speed V has reached the vehicle speed threshold V1. Consequently, the drive control apparatus 10 operates without any hunting. Even while the hybrid vehicle 12 is traveling at the vehicle speed V between the vehicle speed thresholds V1, V2, the third clutch 46 is disengaged after elapse of the time represented by the time threshold C0 because of the timer counter I.

While the third clutch 46 is being engaged, the first PDU 22 controls the field current of the first motor 16, and its temperature rise is larger as the vehicle speed V is higher. When the third clutch 46 is disengaged, the first PDU 22 stops controlling the field current of the first motor 16. Therefore, upon disengagement of the third clutch 46, the temperature of the first PDU 22 is prevented from increasing, and the power consumption of the battery 15 is lowered.

Figure 5:
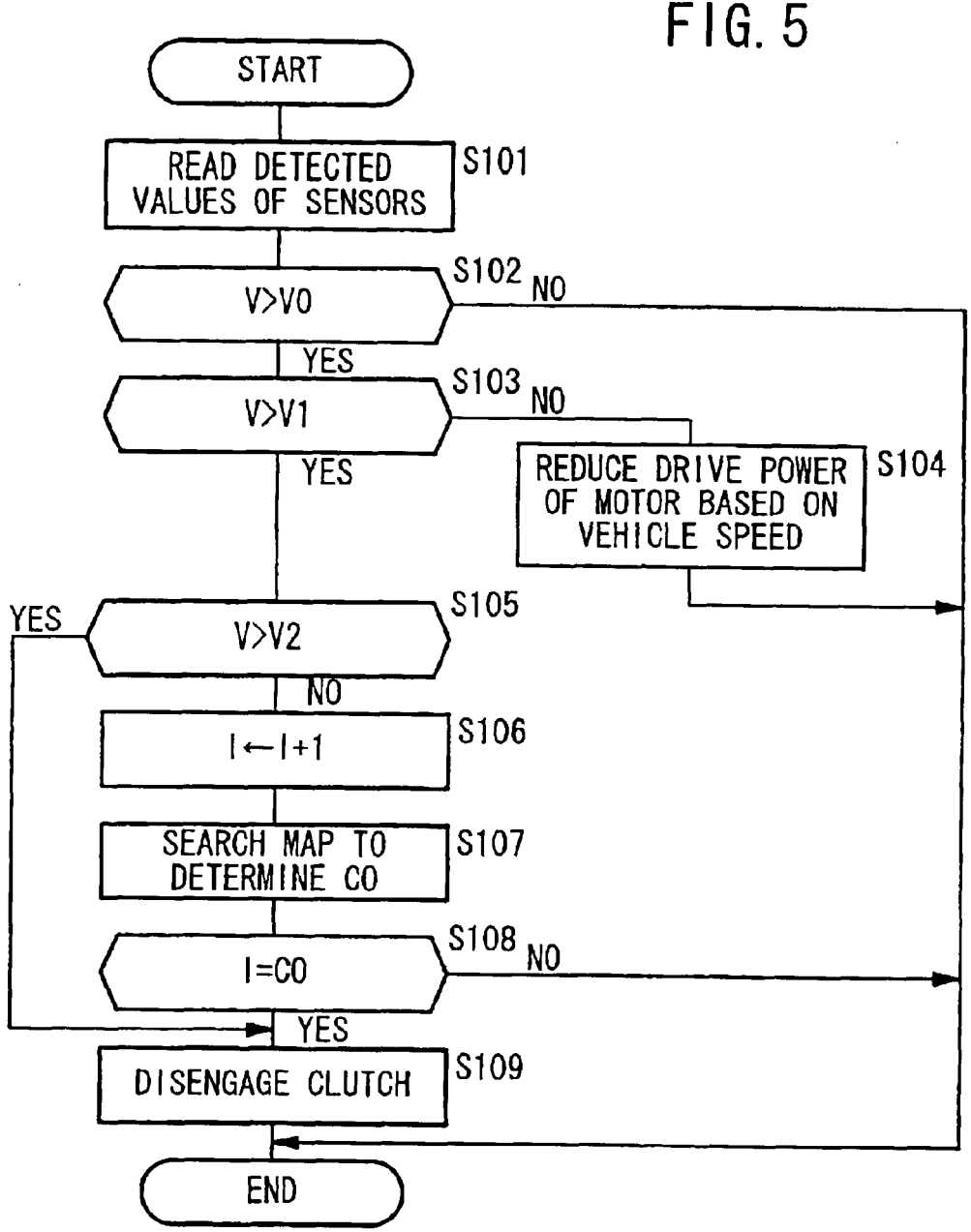
FIG. 5 is a flowchart of a processing sequence of the drive control apparatus according to a second program.

A processing sequence that is executed by the main ECU 20 based on the second program stored in the ROM will be described below with reference to FIGS. 5 and 6. Steps S101 through S106 shown in FIG. 5 are identical to steps S1 through S6 shown in FIG. 4, and steps S108, S109 shown in FIG. 5 are identical to steps S7, S8 shown in FIG. 4. The second program is different from the first program as to step S107 that is inserted between steps S106, S108.

Figure 6:
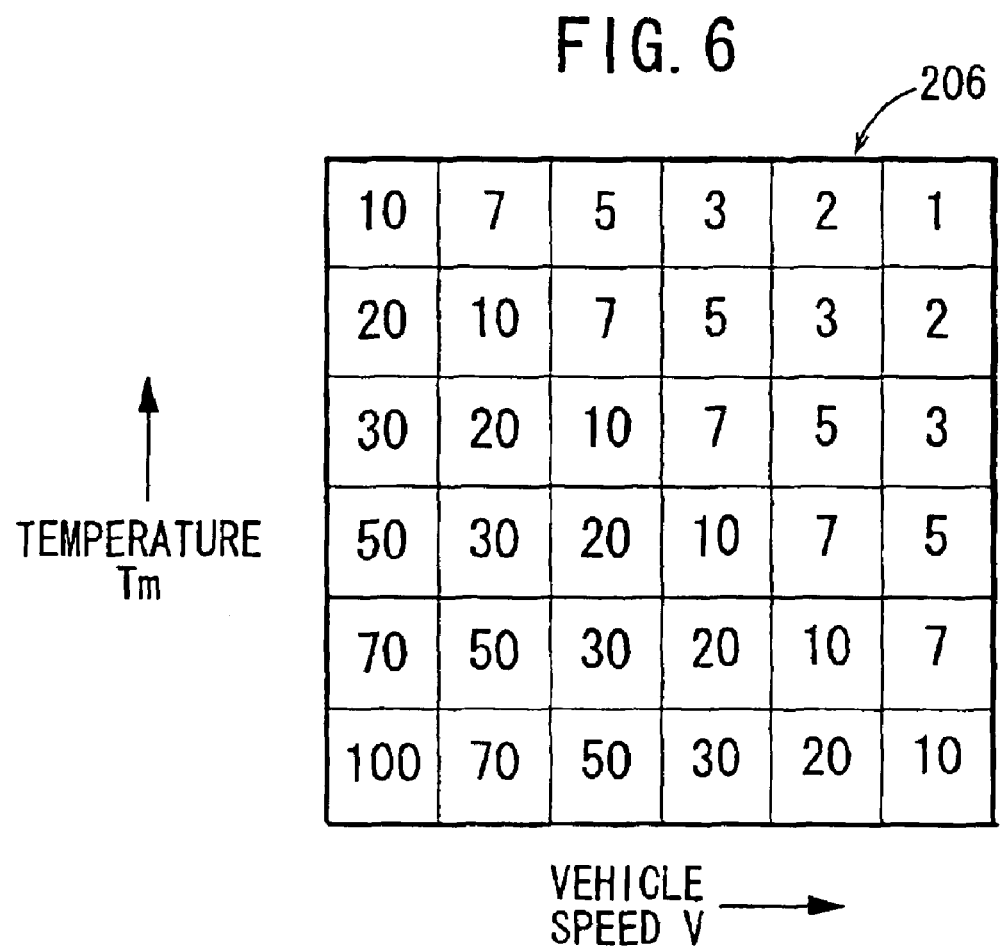
FIG. 6 is a diagram showing the contents of a map where time thresholds for disengaging a clutch are recorded.

In step S107, the main ECU 20 searches a map 206 shown in FIG. 6 for the time threshold C0. The map 206 is used to determine a time to disengage the third clutch 46, and contains different time threshold values C0 that can be determined using vehicle speed values V and temperature values Tm as parameters. The map 206 is established such that the time threshold C0 is smaller as the vehicle speed V and the temperature Tm are higher.

According to the map 206, a time to disengage the third clutch 46 can be set flexibly to allow the third clutch 46 to be disengaged reliably even when the temperature Tm or the vehicle speed V changes, thereby protecting the third motor 16. Particularly, when the temperature Tm or the vehicle speed V abruptly increases, the time threshold C0 is set to a very small value and becomes lower than the value of the timer counter I, whereupon the third clutch 46 is immediately disengaged.

The map 206 may be arranged to retrieve the time threshold C0 using either the vehicle speed V or the temperature Tm as a parameter. Alternatively, the map 206 may be arranged to retrieve the time threshold C0 using the temperature Tb or Tp (see FIG. 2) as a parameter. Further alternatively, the time threshold C0 may be calculated according to an equation where both the vehicle speed V and the temperature Tm are used as parameters.

Figure 7:
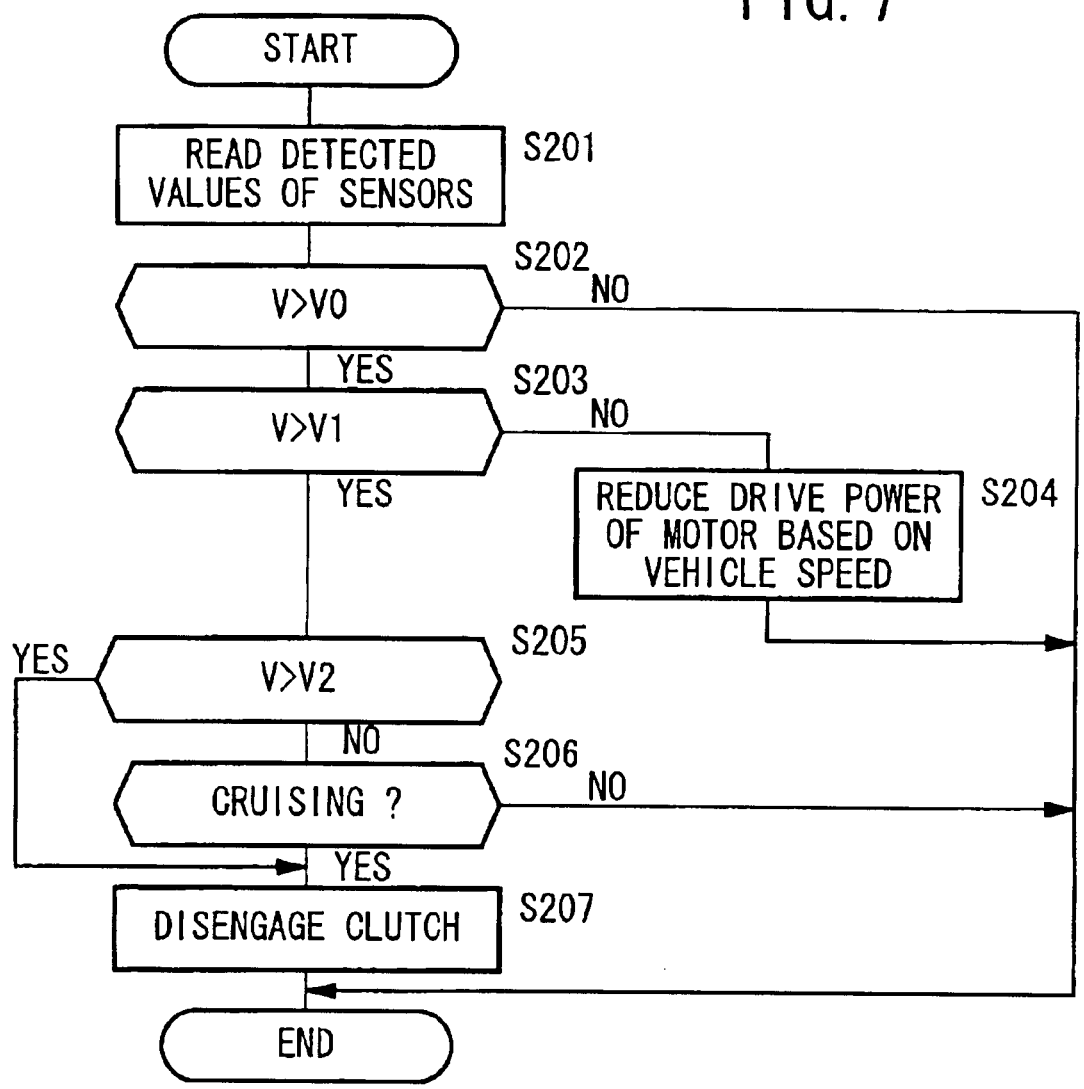
FIG. 7 is a flowchart of a processing sequence of the drive control apparatus according to a third program.

A processing sequence that is executed by the main ECU 20 based on the third program stored in the ROM will be described below with reference to FIG. 7. Steps S201 through S205 shown in FIG. 7 are identical to steps S1 through S5 shown in FIG. 4.

After step S205, the main ECU 20 determines whether the hybrid vehicle 102 is cruising (running stably) or not in step S206. When the hybrid vehicle 102 is cruising, it is traveling at a constant speed over a predetermined period of time or more, and any changes in the accelerator pedal displacement fall within a predetermined range. The main ECU 20 can determine whether the hybrid vehicle 102 is cruising or not based on the difference ΔV between vehicle speeds V detected in the preceding and present cycles and the difference between accelerator pedal displacements detected in the preceding and present cycles. Alternatively, the main ECU 20 may determine that the hybrid vehicle 102 as cruising if a change in the vehicle speed V per given time is equal to or smaller than a predetermined value.

If the hybrid vehicle 102 is cruising, then control goes to step S207. If the hybrid vehicle 102 is not cruising, then the main EPU 20 puts the processing sequence to an end.

In step S207, the main ECU 20 disengages the third clutch 46 as with step S8 shown in FIG. 4.

By executing the third program as described above, the drive control apparatus 10 determines whether the hybrid vehicle 102 is cruising or not after the vehicle speed V has reached the vehicle speed threshold V1. Therefore, the third clutch 46 can be disengaged while the hybrid vehicle 12 is running stably. While the hybrid vehicle 102 is cruising, the hybrid vehicle 12 is not required to travel in a four-wheel-drive mode, and is able to have better mileage. When the third clutch 46 is disengaged, unwanted slip is reduced when the first motor 16 is de-energized at the time the hybrid vehicle 12 is running at a high speed, resulting in improved mileage.

Figure 8:
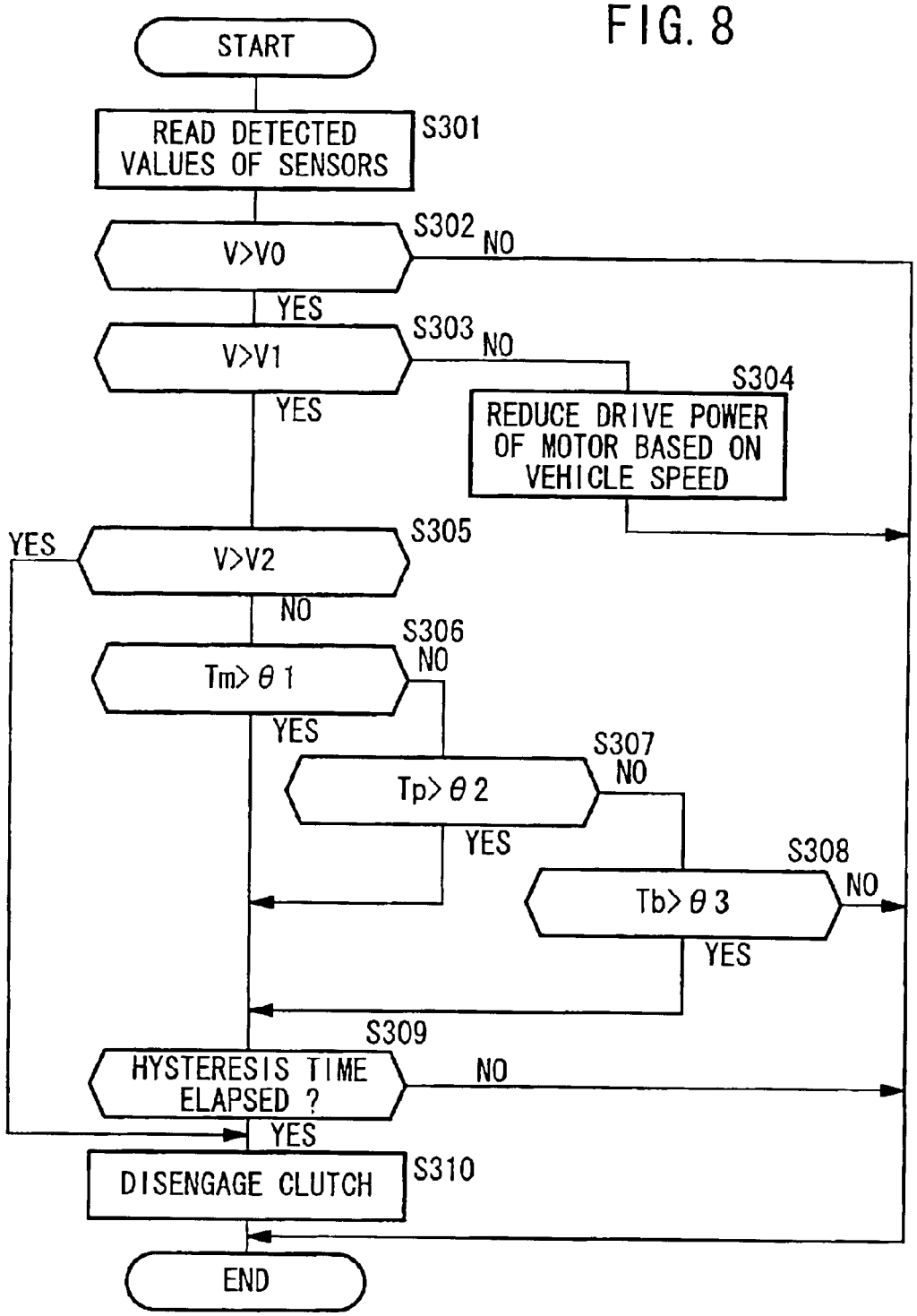
FIG. 8 is a flowchart of a processing sequence of the drive control apparatus according to a fourth program.
Figure 9:
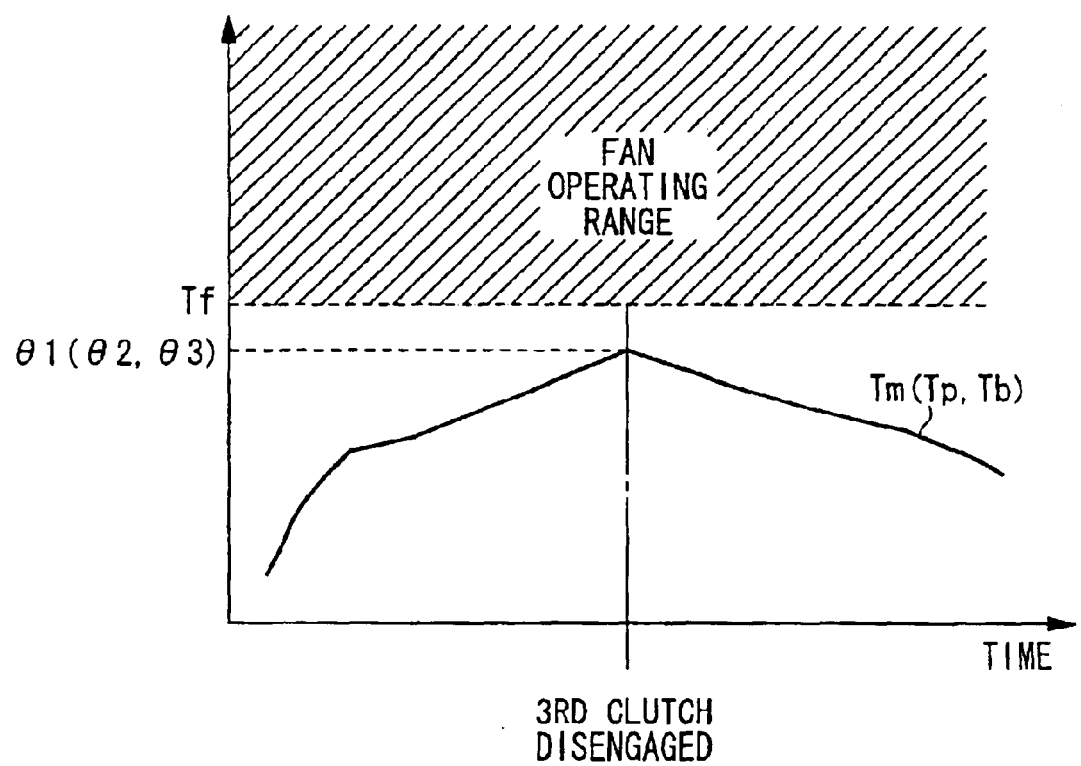
FIG. 9 is a graph showing temperature changes of the motor which occur when the fourth program is executed.

A processing sequence that is executed by the main ECU 20 based on the fourth program stored in the ROM will be described below with reference to FIGS. 8 and 9. Steps S301 through S305 shown in FIG. 8 are identical to steps S1 through S5 shown in FIG. 4.

After step S305, the main ECU 20 compares the temperature Tm of the first motor 16, i.e., the detected value from the motor temperature sensor 116, with a predetermined temperature threshold θ1 in step S306. If the temperature Tm is greater than the temperature threshold θ1, then control goes to step S309. If the temperature Tm is smaller than the temperature threshold θ1, then control goes to step S307.

In step S307, the main ECU 20 compares the temperature Tp of the first PDU 22 with a predetermined temperature threshold θ2. If the temperature Tp is greater than the temperature threshold θ2, then control goes to step S309. If the temperature Tp is smaller than the temperature threshold θ2, then control goes to step S308.

In step S308, the main ECU 20 compares the temperature Tb of the battery 15 with a predetermined temperature threshold θ3. If the temperature Tb is greater than the temperature threshold θ3, then control goes to step S309. If the temperature Tb is smaller than the temperature threshold θ3, then the main EPU 20 puts the processing sequence to an end.

The temperature thresholds θ1, θ2, θ3 are thresholds established based on the temperatures allowing operation of the first motor 16, the first PDU 22, and the battery 15, respectively.

In step S309 (timer function unit), the main ECU 20 confirms whether a predetermined hysteresis time has elapsed or not. The hysteresis time is established in order to engage and disengage the third clutch 46 without hunting, and set to a suitable time threshold. If the hysteresis time has elapsed, then control goes to step S310. If the hysteresis time has not elapsed, then the main EPU 20 puts the processing sequence to an end.

In step S310, the main ECU 20 disengages the third clutch 46 as with step S8 shown in FIG. 4.

By executing the fourth program as described above, the drive control apparatus 10 disengages the third clutch 46 based on the respective temperatures of the first motor 16, the first PDU 22, and the battery 15 and the temperature thresholds θ1, θ2, θ3 that are established based on the temperatures allowing operation of the first motor 16, the first PDU 22, and the battery 15, respectively, after the vehicle speed V has reached the vehicle speed threshold V1. Therefore, the first motor 16, the first PDU 22, and the battery 15 are prevented from being overheated. Since the temperatures of these devices are determined in the order of importance, i.e., the temperatures of the first motor 16, the first PDU 22, and the battery 15, are determined in the stated order, these important devices can reliably be protected.

In steps S306, S307, S308, control passes on to the subsequent steps based on rates of change of the temperatures of the first motor 16, the first PDU 22, and the battery 15. For example, in step S306, the difference ΔTm between the temperatures Tm in preceding and present cycles may be compared with a predetermined threshold Δθ1, and if the difference ΔTm is greater than the threshold Δθ1, then control may go to step S309. In this manner, the first motor 16 may be reliably protected from overheating.

The temperature thresholds θ1, θ2, θ3 used in steps S306, S307, S308 may be set to a temperature lower than the operation start temperature Tf of the fans 75a, 75b. By setting the temperature thresholds θ1, θ2, θ3 as such, since the third clutch 46 is disengaged before the temperature Tm, Tp, or Tf reaches the operation start temperature Tf, the temperature of the first motor 16, the first PDU 22, and the battery 15 are prevented from rising, as shown in FIG. 9. As a result, the number of times that the fans 75a, 75b operate is reduced, thus reducing a friction loss and electric power consumption of the actuators of the fans 75a, 75b.

Figure 10:
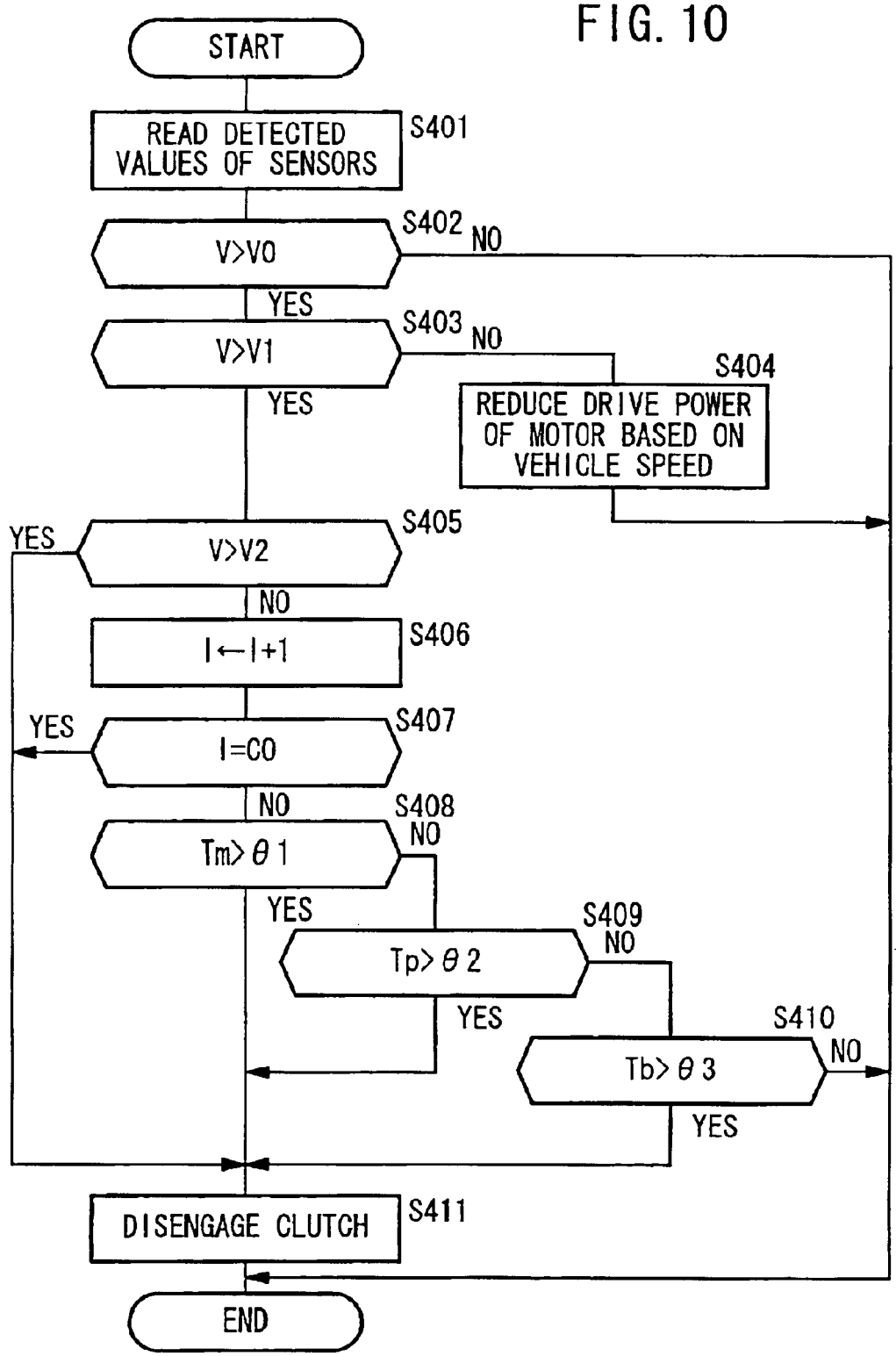
FIG. 10 is a flowchart of a processing sequence of the drive control apparatus according to a fifth program.

A processing sequence that is executed by the main ECU 20 based on the fifth program stored in the ROM will be described below with reference to FIG. 10. Steps S401 through S406 shown in FIG. 10 are identical to steps S1 through S6 shown in FIG. 4.

After step S406, the main ECU 20 compares the value of the timer counter I with a predetermined time threshold C0 in step S407. If the value of the timer counter I is smaller than the time threshold C0, then control goes to step S408. If the value of the timer counter I is equal to the time threshold C0, then control goes to step S411.

Steps S408 through S410 are identical to steps S306 through S308 shown in FIG. 8. If the conditions in steps S408 through S410 are satisfied, then control goes to step S411.

In step S411, the main ECU 20 disengages the third clutch 46 as with step S8 shown in FIG. 4.

By executing the fifth program as described above, the drive control apparatus 10 disengages the third clutch 46 based on the temperatures Tm, Tp, Tb of the first motor 16, the first PDU 22, and the battery 15 after the vehicle speed V has reached the vehicle speed threshold V1. Therefore, the first motor 16, the first PDU 22, and the battery 15 are prevented from being overheated. Since the timer function is incorporated in the processing sequence shown in FIG. 10, even when the temperature rise of the temperatures Tm, Tp, Tb is slight, the third clutch 46 is reliably disengaged after elapse of a suitable period of time.

Figure 11:
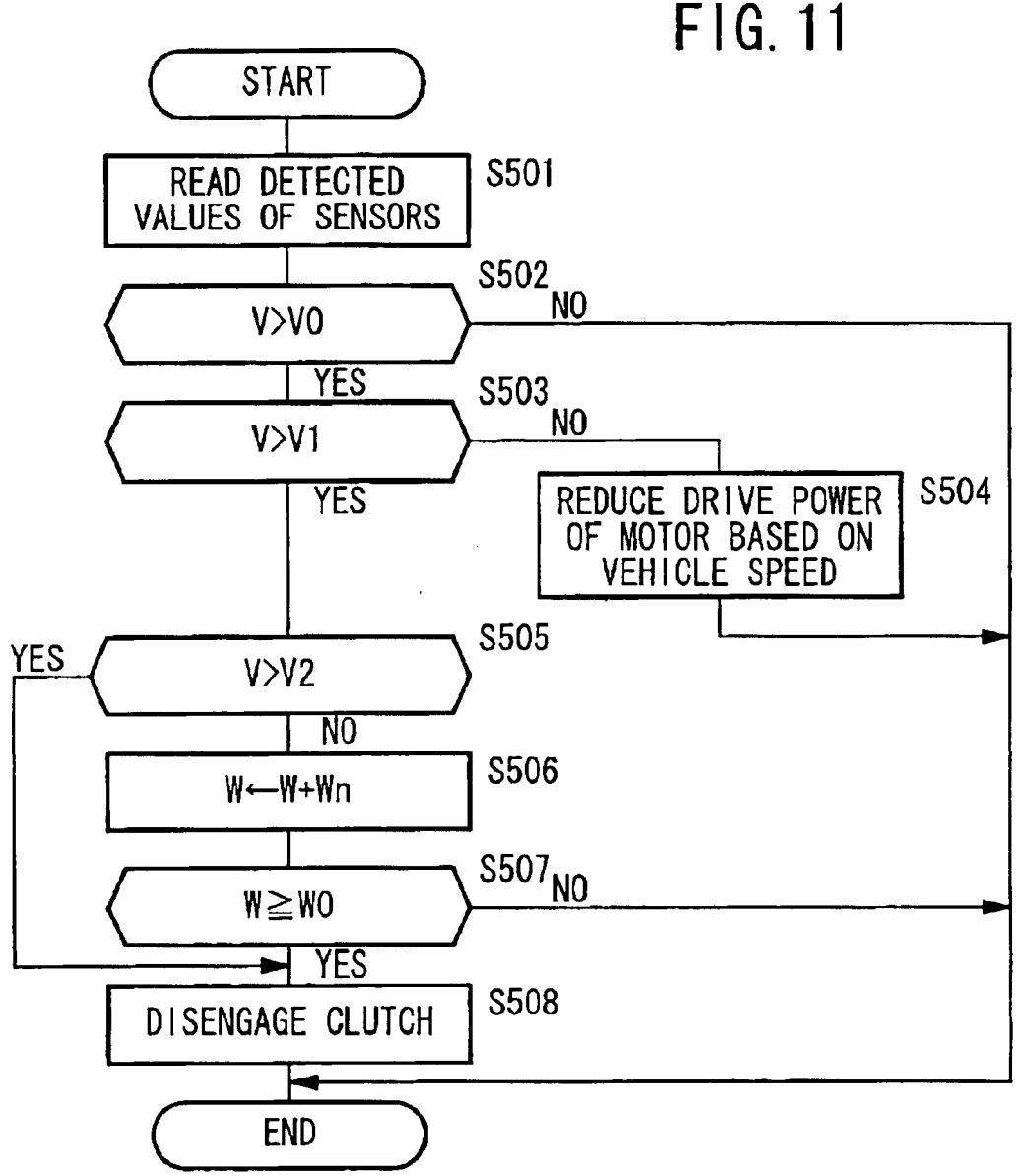
FIG. 11 is a flowchart of a processing sequence of the drive control apparatus according to a sixth program.

A processing sequence that is executed by the main ECU 20 based on the sixth program stored in the ROM will be described below with reference to FIGS. 11 and 12. Steps S501 through S505 shown in FIG. 11 are identical to steps S1 through S5 shown in FIG. 4. In step S504, however, a heating integration counter W, rather than the timer counter I, is initialized.

After step S505, the main ECU 20 accumulatively adds an amount of heat Wn (W←W+Wn) generated by the first motor 16 in the heating integration counter W (see FIG. 12) in step S506. The amount of heat Wn is calculated from a current supplied to the first motor 16, an equivalent resistance of the first motor 16, a heat radiating area of the first motor 16, etc.

In step S507, the main ECU 20 compares the value of the heating integration counter W with a predetermined amount-of-heat threshold W0. If the value of the heating integration counter W is smaller than the amount-of-heat threshold W0, then the main EPU 20 puts the processing sequence to an end. If the value of the heating integration counter W is greater than the amount-of-heat threshold W0, then control goes to step S508.

Figure 12:
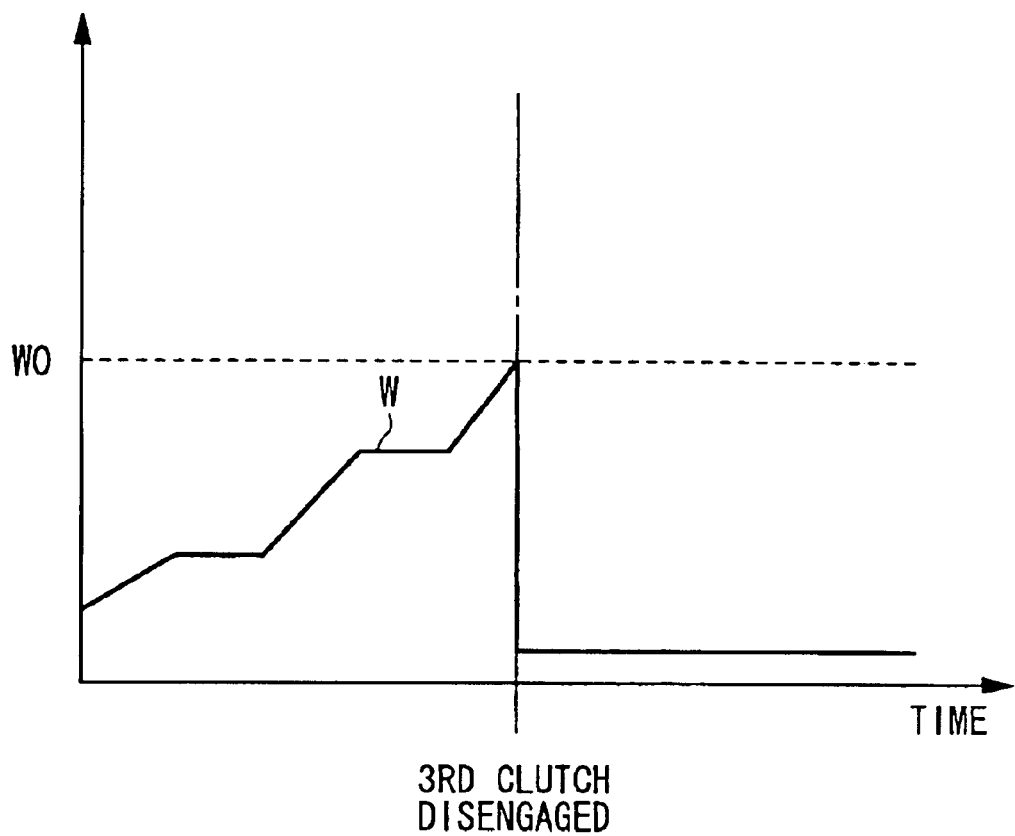
FIG. 12 is a graph showing changes in the count of a heating integration counter which occur when the sixth program is executed.

In step S508, the main ECU 20 disengages the third clutch 46 as with step S8 shown in FIG. 4 (see FIG. 12).

By executing the sixth program as described above, the drive control apparatus 10 disengages the third clutch 46 based on the amount of heat Wn generated by the first motor 16 after the vehicle speed V has reached the vehicle speed threshold V1. Therefore, the third clutch 46 is reliably disengaged even if there is the motor temperature sensor 116 is not provided on the first motor 16, thus preventing the first motor 16 from being overheated.

An amount of heat generated by the first PDU 22 or the battery 15, rather than the first motor 16, may be calculated and processed to prevent the first PDU 22 or the battery 15 from being overheated. The amount of heat generated by the battery 15 may be calculated based on the detected value of the current sensor 70.

In step S506, a constant N0 may be added to the amount of heat which is accumulatively added in the heating integration counter W (W←W+Wn+N0). By adding such a constant, even if the amount of heat Wn is a small value, the value of the heating integration counter W keeps increasing until the third clutch 46 is disengaged after elapse of a predetermined period of time. Stated otherwise, the added constant functions like a timer function.

Figure 13:
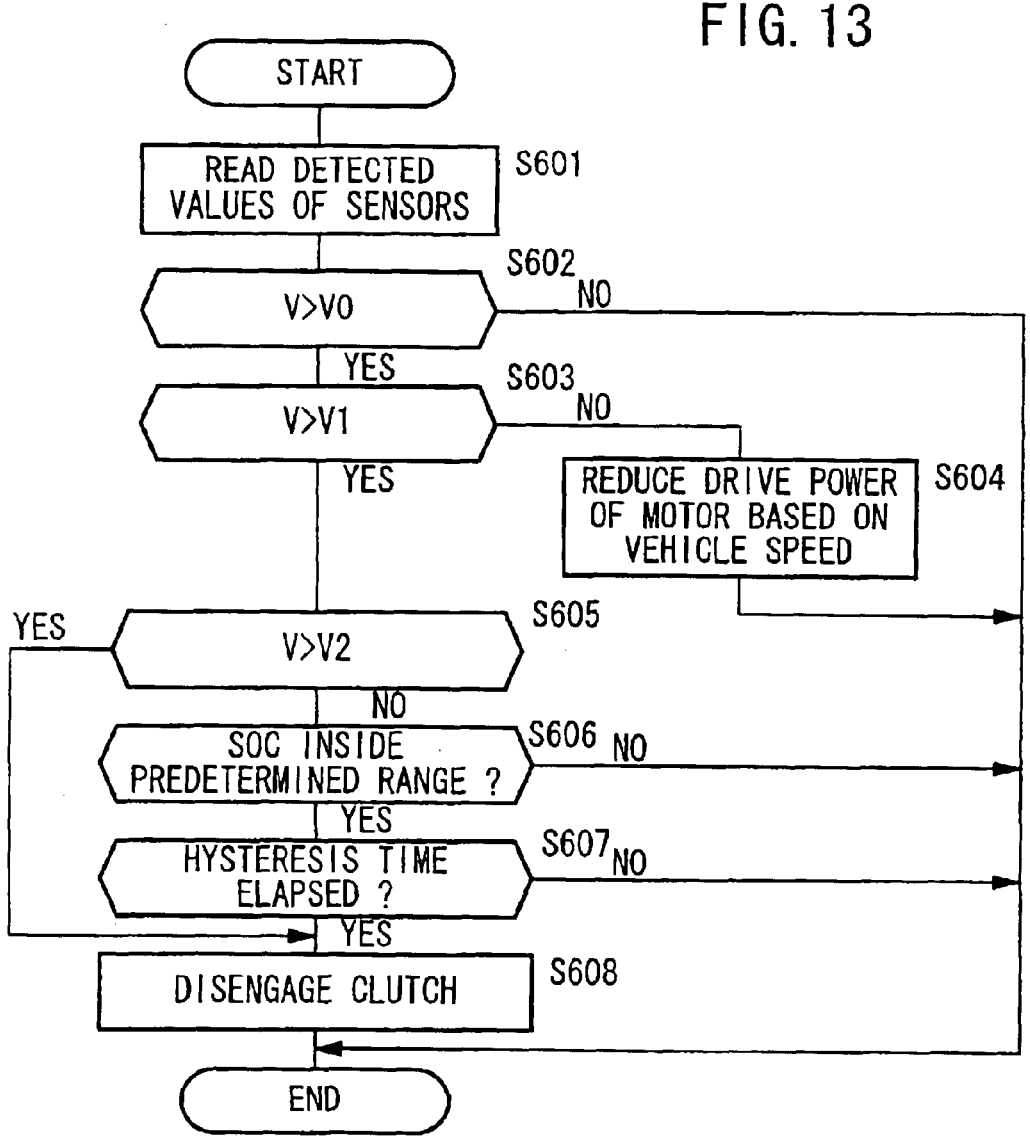
FIG. 13 is a flowchart of a processing sequence of the drive control apparatus according to a seventh program.
Figure 14:
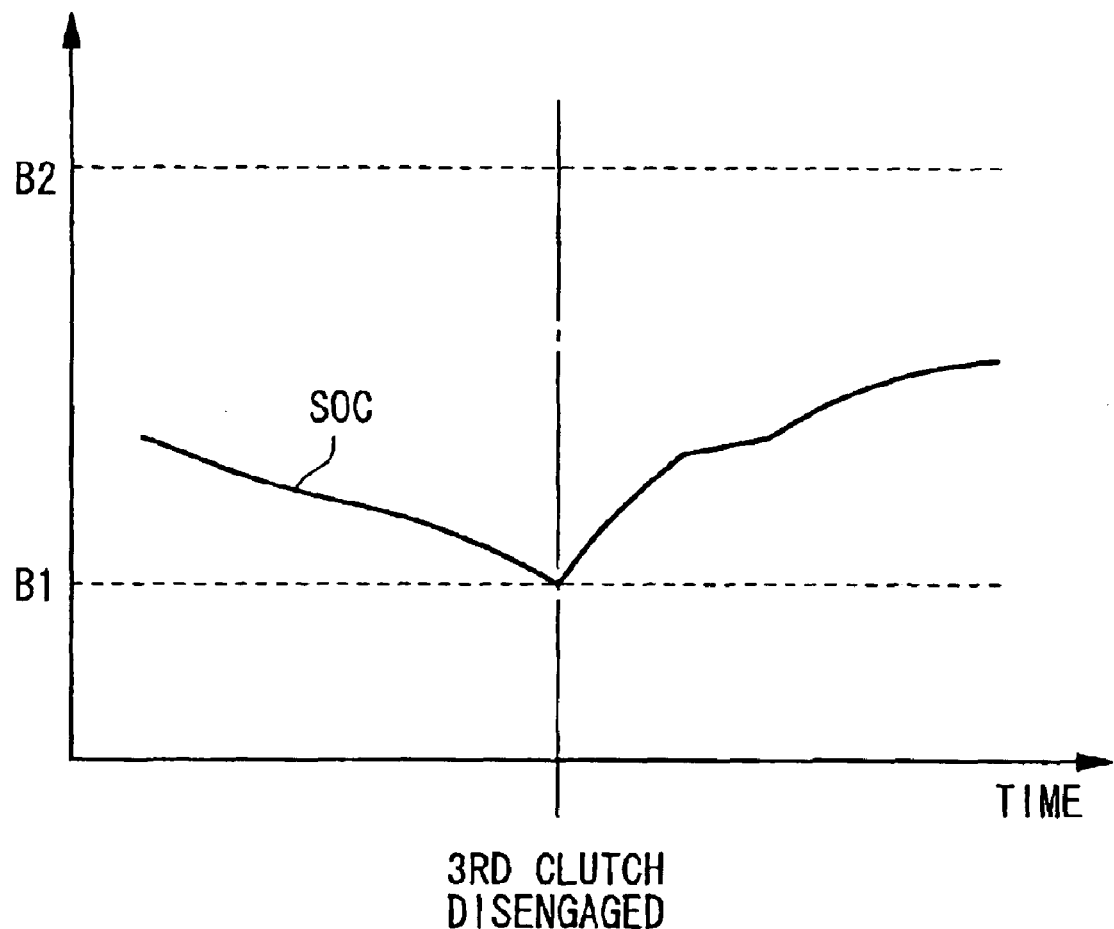
FIG. 14 is a graph showing changes in the state of charge which occur when the seventh program is executed.

A processing sequence that is executed by the main ECU 20 based on the seventh program stored in the ROM will be described below with reference to FIGS. 13 and 14. Steps S601 through S605 shown in FIG. 13 are identical to steps S1 through S5 shown in FIG. 4.

After step S605, the main ECU 20 confirms whether the state of charge (SOC) falls in a predetermined range or not, i.e., in a range between predetermined state-of-charge thresholds B1, B2, or not in step S606.

The state-of-charge threshold B1 is a relatively small value, indicating that the state of charge of the battery 15 is small, and the battery 15 is nearly over discharged. The state-of-charge threshold B2 is of a relatively large value, indicating that the state of charge of the battery 15 is large, and the battery 15 is in a sufficiently charged state.

If the state of charge falls between the state-of-charge thresholds B1, B2, then control goes to step S607. If the state of charge falls outside the range between the state-of-charge thresholds B1, B2, then the main EPU 20 puts the processing sequence to an end.

In step S607, the main ECU 20 confirms whether a predetermined hysteresis time has elapsed or not. The hysteresis time is set in order to engage and disengage the third clutch 46 without hunting, and set to a suitable time threshold. If the hysteresis time has elapsed, then control goes to step S608. If the hysteresis time has not elapsed, then the main EPU 20 puts the processing sequence to an end.

In step S608, the main ECU 20 disengages the third clutch 46 as with step S8 shown in FIG. 4 (see FIG. 12). When the third clutch 46 is disengaged, since the first motor 16 does not need to be energized, the current consumed from the battery 15 is reduced, allowing the state of charge of the battery 15 to start increasing, as shown in FIG. 14.

By executing the seventh program as described above, the drive control apparatus 10 disengages the third clutch 46 based on the state of charge after the vehicle speed V has reached the vehicle speed threshold V1.

If the state of charge is smaller than the state-of-charge threshold B1, then the third clutch 46 may be disengaged and the first motor 16 may be energized to reduce the power consumption of the battery 15, and prevent the battery 15 from being over discharged. If the state of charge is greater than the state-of-charge threshold B1, then since no regenerative process is required, the third clutch 46 may be disengaged.

In step S606, a control branching decision may be made based on a rate of change of the state of charge. For example, the difference ΔSOC between the remaining amounts of electric power SOC preceding and present cycles may be compared with a predetermined threshold ΔB, and if the difference ΔSOC is greater than the threshold ΔB, then control may go to step S607. In this manner, the battery 15 may be protected.

Figure 15:
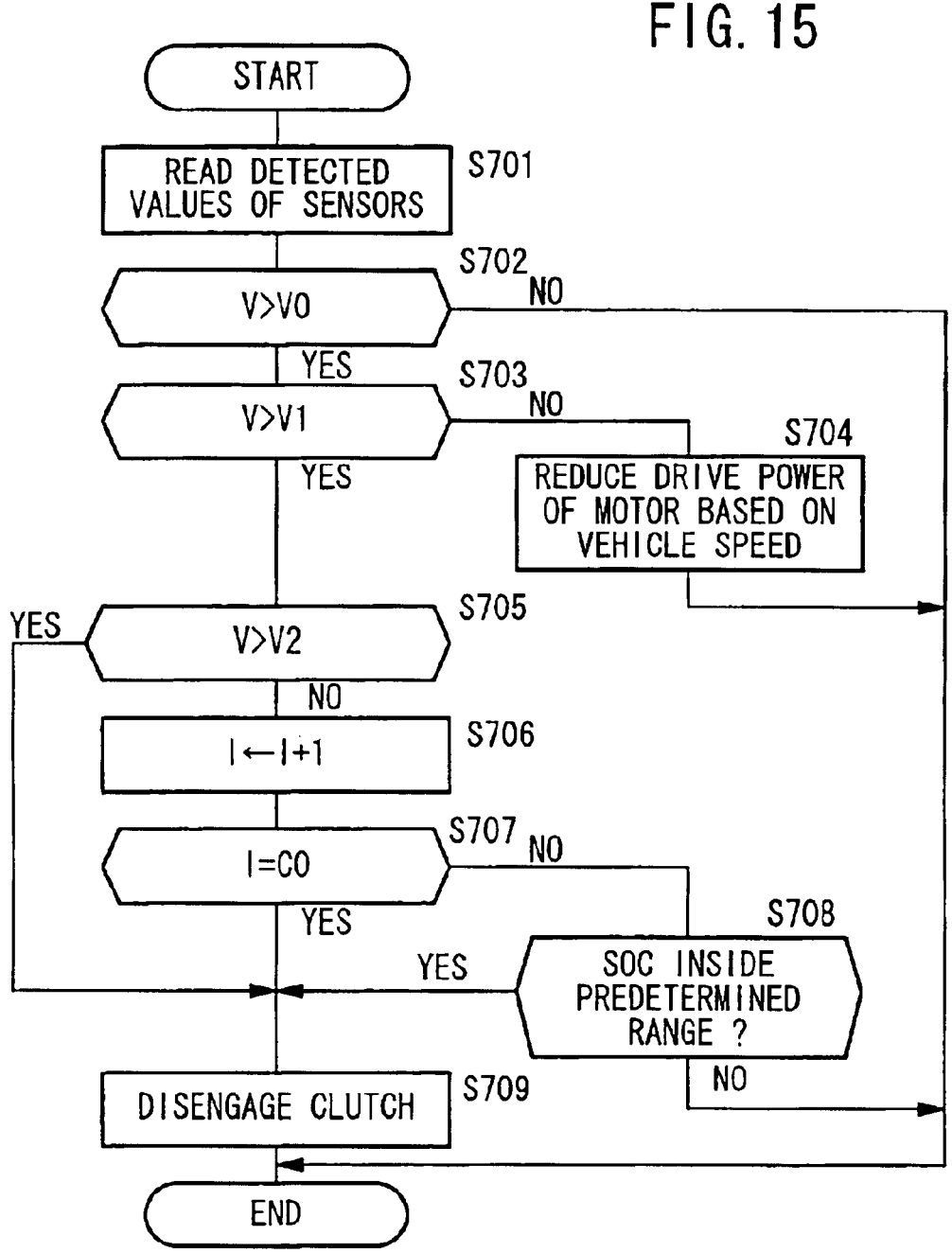
FIG. 15 is a flowchart of a processing sequence of the drive control apparatus according to an eighth program.

A processing sequence that is executed by the main ECU 20 based on the eighth program stored in the ROM will be described below with reference to FIG. 15. Steps S701 through S706 shown in FIG. 15 are identical to steps S1 through S6 shown in FIG. 4.

After step S706, the main ECU 20 compares the value of the timer counter I with a predetermined time threshold C0. If the value of the timer counter I is smaller than the time threshold C0, then control goes to step S708. If the value of the timer counter I is equal to the time threshold C0, then control goes to step S709.

In step S708, the main ECU 20 confirms whether the state of charge falls in a predetermined range or not, i.e., in a range between predetermined state-of-charge thresholds B1, B2, or not. The processing in step S708 is the same as the processing in step S606.

In step S709, the main ECU 20 disengages the third clutch 46 as with step S8 shown in FIG. 4 (see FIG. 12).

By executing the eighth program as described above, the drive control apparatus 10 disengages the third clutch 46 based on the state of charge and the timer function after the vehicle speed V has reached the vehicle speed threshold V1. Therefore, even if the state of charge falls in the predetermined range, the third clutch 46 is disengaged by the function of the timer counter I after elapse of the time represented by the time threshold C0.

As described above, the drive control apparatus 10 according to the present invention gradually reduces the drive power generated by the first motor 16 depending on the vehicle speed V from the time when the vehicle speed V exceeds the vehicle speed threshold V0. When the third clutch 46 is disengaged, i.e., when the vehicle speed V falls in a range between the vehicle speed thresholds V1, V2 which provide a hysteresis range, the drive power generated by the first motor 16 is "0". Accordingly, when the third clutch 46 is disengaged, there is no change in the drive power and there is no shock.

When the vehicle speed V falls in a range between the vehicle speed thresholds V1, V2, the third clutch 46 is disengaged based on other conditions than the vehicle speed V, i.e., the value of the state of charge, the temperatures Tm, Tp, Tb of the first motor 16, the battery 15, and the first PDU 22, or the value of the heating integration counter W, the value of the timer counter I, and the result of the process for determining whether the vehicle is in the cruise mode. Consequently, the third clutch 46 is engaged and disengaged less frequently, and the period of time in which the first motor 16 operates with the drive power being "0" is reduced. Thus, the first motor 16 and the third clutch 46 have increased durability for a longer service life, and the electric power consumption of the battery 15 which is required to energize the first motor 16 is reduced.

By disengaging the third clutch 46 under the above conditions, the frequency with which to engage and disengage the third clutch 46 is reduced, and the vehicle speed threshold V1 can be set in a high speed range close to the vehicle speed threshold V2. Furthermore, the first motor 16 can generate drive power into a high speed range, and the mileage of the hybrid vehicle 12 can be increased when it runs at a high speed.

As can be seen from FIG. 3, since the drive power generated by the first motor 16 is solely determined by the vehicle speed V, it does not make vehicle occupants uncomfortable.

The drive control apparatus 10 necessarily disengages the third clutch 46 when the vehicle V reaches the vehicle speed threshold V2 that is set from the rated rotational speed of the first motor 16, irrespective of the timer function and the value of the state of charge. Therefore, the first motor 16 is reliably protected.

The processes regarding the value of the state of charge, the temperatures Tm, Tp, Tb of the first motor 16, the battery 15, and the first PDU 22, or the value of the heating integration counter W, the value of the timer counter I, and the result of the process for determining whether the vehicle is in the cruise mode, may be combined as desired to determine conditions for disengaging the third clutch 46.

Processes for connecting the third clutch 46 will be described below with reference to FIGS. 16 through 30.

First, a processing sequence that is executed by the main ECU 20 based on the ninth program stored in the ROM will be described below with reference to FIG. 16.

In step S1001, the main ECU 20 reads detected values of the various sensors that are connected to the main ECU 20, and also reads various data. Specifically, the ECU 20 reads detected values of the sensors and switches including the vehicle speed sensors 50a through 50d, the accelerator sensor 108, the steering angle sensor 114, the acceleration sensor 115, and the shift position switch 98, and also reads data representing the state of charge, the temperature Tm of the first motor 16, the temperature Tp of the first PDU 22, and the temperature Tb of the battery 15.

In step S1002, the main ECU 20 compares the vehicle speed V with the vehicle speed threshold V2. If the vehicle speed V is smaller than the vehicle speed threshold V2, then control goes to step S1004. If the vehicle speed V is greater than the vehicle speed threshold V2, then the main ECU 20 disengages the third clutch 46 in step S1003, and then the main EPU 20 puts the processing sequence to an end. The third clutch 46 is disengaged in order to prevent the first motor 16 from being overheated when the vehicle speed V is equal to or greater than the vehicle speed threshold V2.

In step S1004, the main ECU 20 compares the vehicle speed V with the vehicle speed threshold V1. If the vehicle speed V is greater than the vehicle speed threshold V1, then control goes to step S1005. If the vehicle speed V is smaller than the vehicle speed threshold V1, then control jumps to step S1007.

In step S1005, the main ECU 20 determines a deceleration G2 from the data supplied from the acceleration sensor 115.

In step S1006, the main ECU 20 determines whether the deceleration G2 is greater than a predetermined value or not. If the deceleration G2 is greater than the predetermined value, then control goes to step S1007. If the deceleration G2 is equal to or smaller than the predetermined value, then the main EPU 20 puts the processing sequence to an end.

In step S1007, the main ECU 20 confirms whether the third clutch 46 is disengaged or not. If the third clutch 46 is disengaged, then control goes to step S1008. If the third clutch 46 is engaged, then the main EPU 20 puts the processing sequence to an end.

In step S1008, the main ECU 20 energizes the first motor 16 to equalize its rotational speed to the rotational speed of the drive shaft 47. Specifically, since the drive shaft 47 is rotated by the rear wheels 27a, 27b, the first motor 16 is energized to reduce a slip of the third clutch 46 when it is engaged. Specifically, the difference between the rotational speeds of the first motor 16 and the drive shaft 47 is reduced to a sufficiently small value.

In step S1009, the main ECU 20 supplies a command to the clutch driver 64 to engage the third clutch 46. Based on the supplied command, the clutch driver 64 engages the third clutch 46 and confirms the engagement of the third clutch 46 with a signal from the clutch switch 68.

At this time, since V1<V<V2 and the drive power generated by the first motor 16 is "0" (see FIG. 3), the drive power does not change when the third clutch 46 is engaged, and the vehicle occupants do not feel uncomfortable. Inasmuch as the drive power transmitted by the third clutch 46 is "0" and the rotational speeds of the first motor 16 and the drive shaft 47 are substantially the same, the third clutch 46 causes almost no slip when it is engaged, and hence, its durability increased.

Even with the vehicle speed V being greater than the vehicle speed threshold V1, the third clutch 46 is engaged when the deceleration G2 is relatively large. Therefore, when the vehicle speed V subsequently becomes equal to or smaller than the vehicle speed threshold V1, the first motor 16 can immediately regenerate electric energy or generate drive power. When the deceleration G2 is small, the third clutch 46 is not engaged until the vehicle speed V becomes equal to or smaller than the vehicle speed threshold V1. Consequently, a speed range and a period of time in which the first motor 16 is rotated with the drive power being "0" are small. Thus, the first motor 16 consumed a reduced current and has its durability increased for a longer service life.

A processing sequence that is executed by the main ECU 20 based on the tenth program stored in the ROM will be described below with reference to FIG. 17. Steps S1101 through S1104 shown in FIG. 17 are identical to steps S1001 through S1004 shown in FIG. 16, and steps S1106 through S1109 shown in FIG. 17 are identical to steps S1006 through S1009 shown in FIG. 16. The tenth program is different from the ninth program as to step S1105 (deceleration detection unit).

In step S1105, the main ECU 20 determines a vehicle speed change $V_0-V$ as the difference between the vehicle speed $V_0$ in the preceding cycle and the vehicle speed V, and also determines a deceleration G2 from the period of time that has elapsed from the preceding cycle. In this manner, the main ECU 20 can determine the deceleration G2 based on detected signals from the vehicle speed sensors 50a through 50d. Therefore, there is no need to use the acceleration sensor 115.

In step S1106, the main ECU 20 determines whether the deceleration G2 is greater than a predetermined value or not. If the deceleration G2 is greater than the predetermined value, then control goes to step S1107 to determine whether the third clutch 46 is disengaged or not. If the third clutch 46 is disengaged, then the main ECU 20 equalizes the rotational speed of the first motor 16 to the rotational speed of the drive shaft 47 in step S1108. Then, the main ECU 20 engages the third clutch 46 in step S1109. If the deceleration G2 is smaller than the predetermined value in step S1106, then the main EPU 20 puts the processing sequence to an end.

Figure 18:
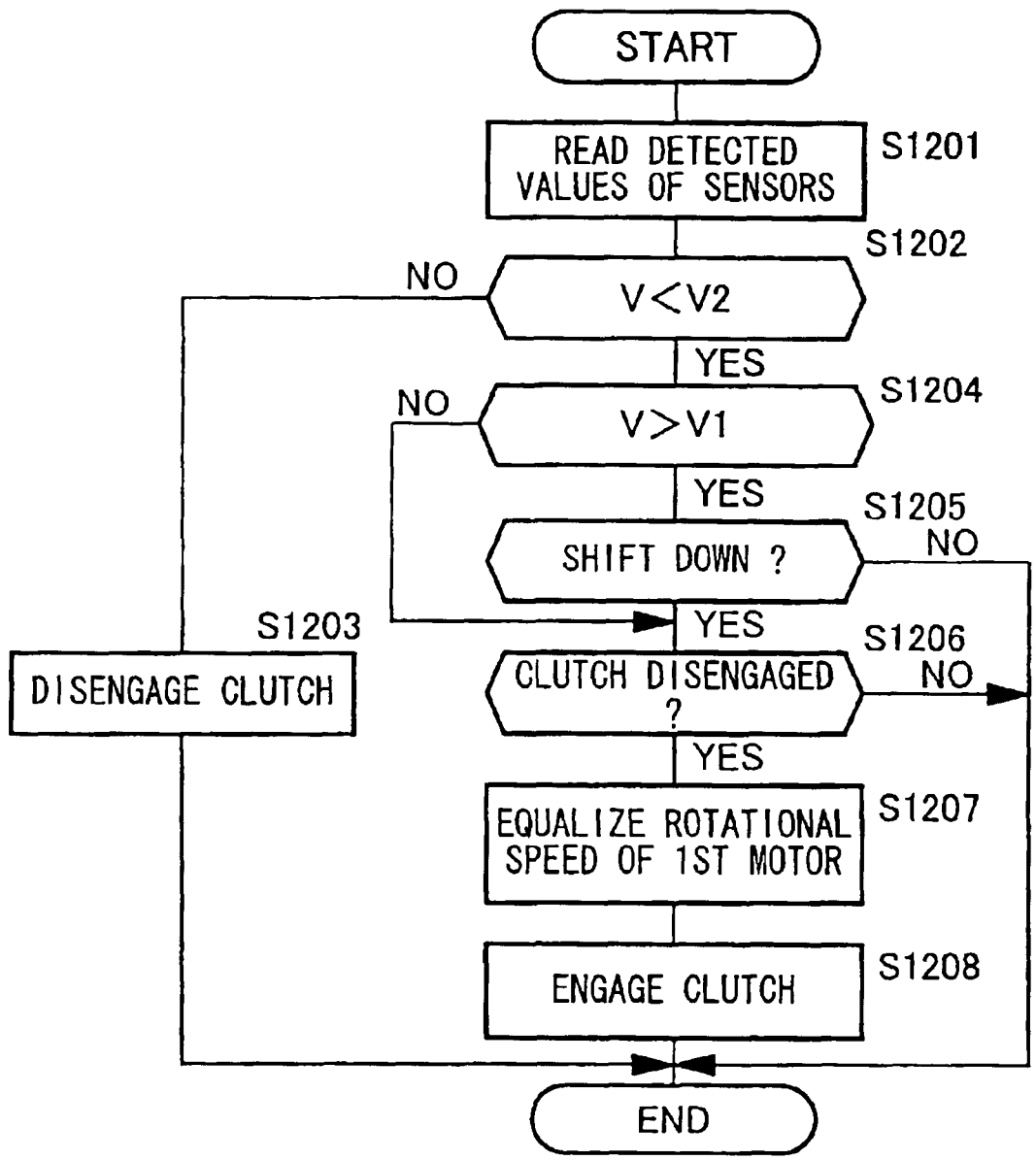
FIG. 18 is a flowchart of a processing sequence of the drive control apparatus according to an eleventh program.

A processing sequence that is executed by the main ECU 20 based on the eleventh program stored in the ROM will be described below with reference to FIG. 18. Steps S1201 through S1204 shown in FIG. 18 are identical to steps S1001 through S1104 shown in FIG. 16, and steps S1206 through S1208 shown in FIG. 18 are identical to steps S1007 through S1009 shown in FIG. 16. The eleventh program is different from the ninth program as to step S1205.

In step S1205, the main ECU 20 confirms the state of the shift position switch 98 to determine whether a shift-down action is performed or not. If a shift-down action is made, then control goes to step S1206. If a shift-down action is not performed or if a shift-up action is performed, then the main EPU 20 puts the processing sequence to an end.

Since step S1205 is executed when V1<V<V2, if a shift-down action is made, then it can be judged that the driver of the hybrid vehicle 12 is willing to decelerate the hybrid vehicle 12, and it is clear that the hybrid vehicle 12 will be decelerated. By engaging the third clutch 46 before the vehicle speed V becomes equal to or lower than the vehicle speed threshold V1, the first motor 16 can regenerate electric energy or generate drive power immediately when the vehicle speed V becomes equal to or lower than the vehicle speed threshold V1. The shift-down action referred to above may be an action in a manual transmission, an action in an automatic transmission, or an action in a pseudo-manual mode of a continuously variable transmission.

The main ECU 20 may judge that the driver is willing to decelerate the hybrid vehicle 12 by detecting the stepping of the brake pedal of the hybrid vehicle 12 based on the detected state of the brake switch 112 (see FIG. 2).

Figure 19:
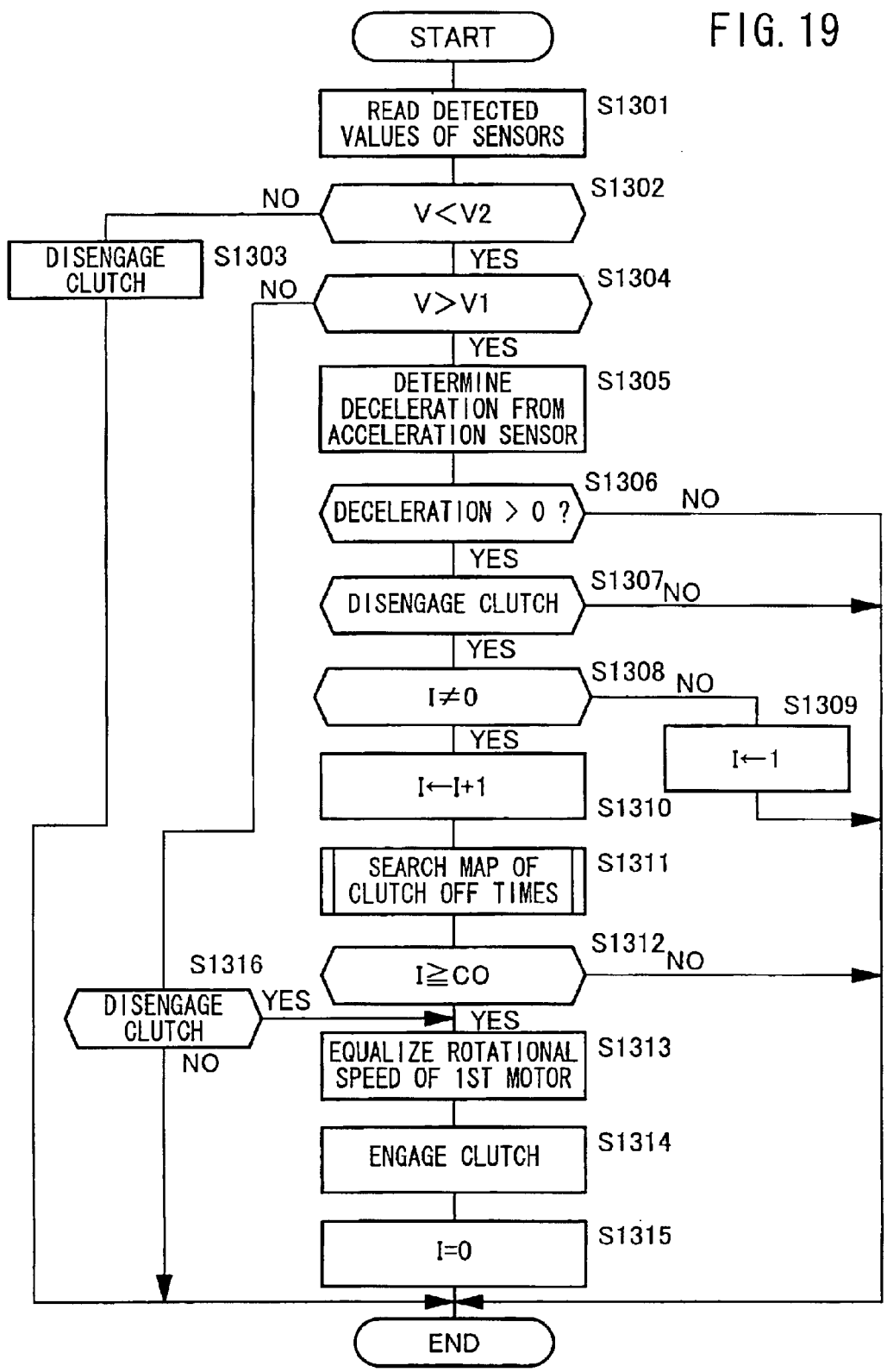
FIG. 19 is a flowchart of a processing sequence of the drive control apparatus according to a twelfth program.

A processing sequence that is executed by the main ECU 20 based on the twelfth program stored in the ROM will be described below with reference to FIGS. 19 and 20. Steps S1301 through S1305 shown in FIG. 19 are identical to steps S1001 through S1105 shown in FIG. 16, and steps S1313, S134 shown in FIG. 18 are identical to steps S1008, S1009 shown in FIG. 16.

After step S1305, the main ECU 20 confirms the value of the deceleration G2 in step S1306. If the deceleration G2 is a positive value, then control goes to step S1307. If the deceleration G2 is "0" or is a negative value, then the main EPU 20 puts the processing sequence to an end. The deceleration G2 which is a negative value indicates that the hybrid vehicle 12 is accelerating and that the acceleration G1 is a positive value.

Figure 16:
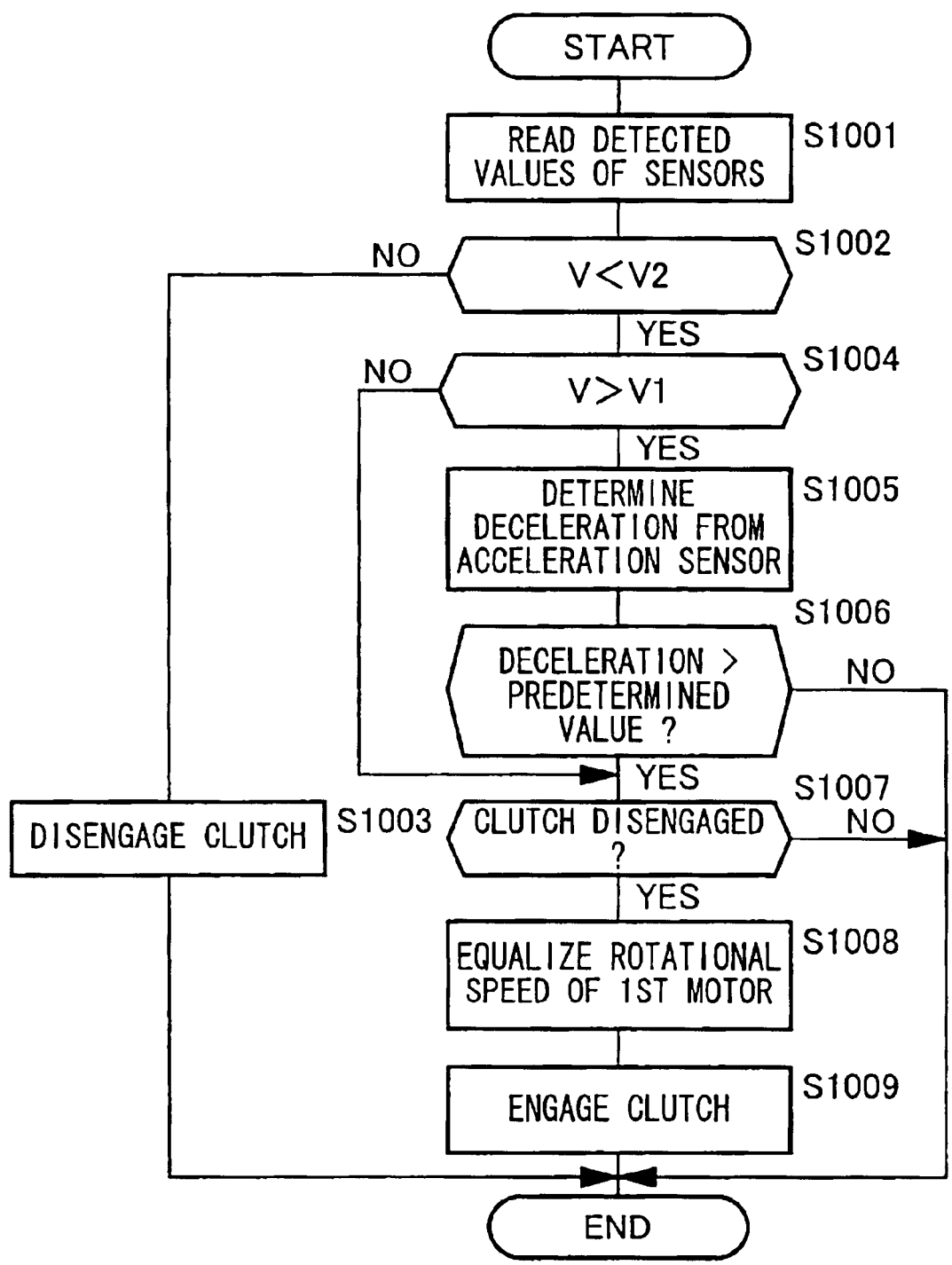
FIG. 16 is a flowchart of a processing sequence of the drive control apparatus according to a ninth program.
Figure 17:
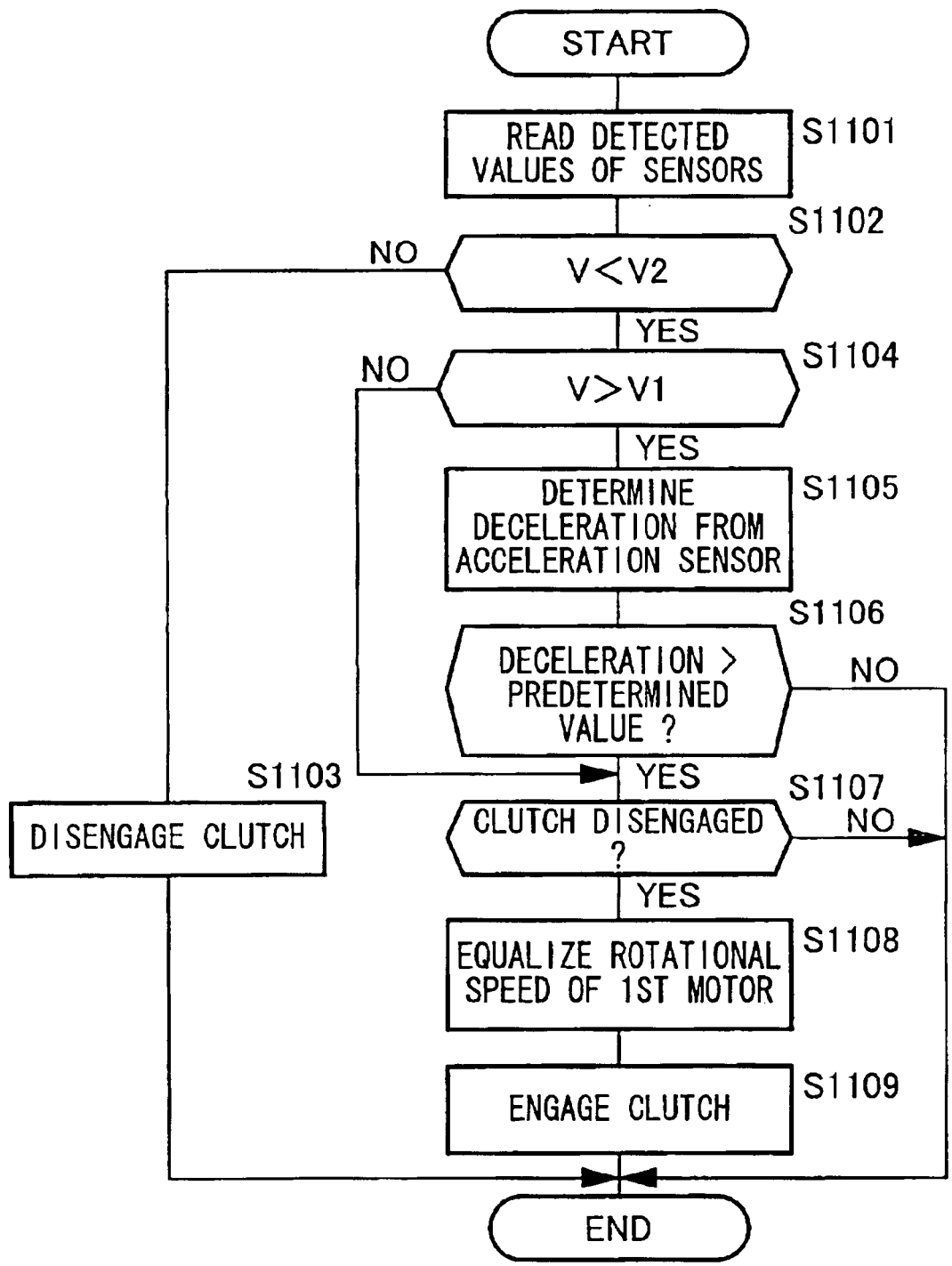
FIG. 17 is a flowchart of a processing sequence of the drive control apparatus according to a tenth program.

In step S1307, the main ECU 20 confirms that the third clutch 46 is disengaged as with the step S1007 shown in FIG. 16. Thereafter, control goes to step S1308. If the third clutch 46 is engaged, then the main EPU 20 puts the processing sequence to an end.

In step S1308, the main ECU 20 confirms the value of the timer counter (timer function unit) I. If the value of the timer counter I is "0", then the main ECU 20 sets it to "1" in step S1309, and puts the processing sequence to an end. If the value of the timer counter I is other than "0", then control goes to step S1310. The timer counter I is set to "0" in its initial state.

In step S1310, the main ECU 20 counts up the timer counter I by setting it to I←I+1. Then, control goes to step S1311.

Figure 20:
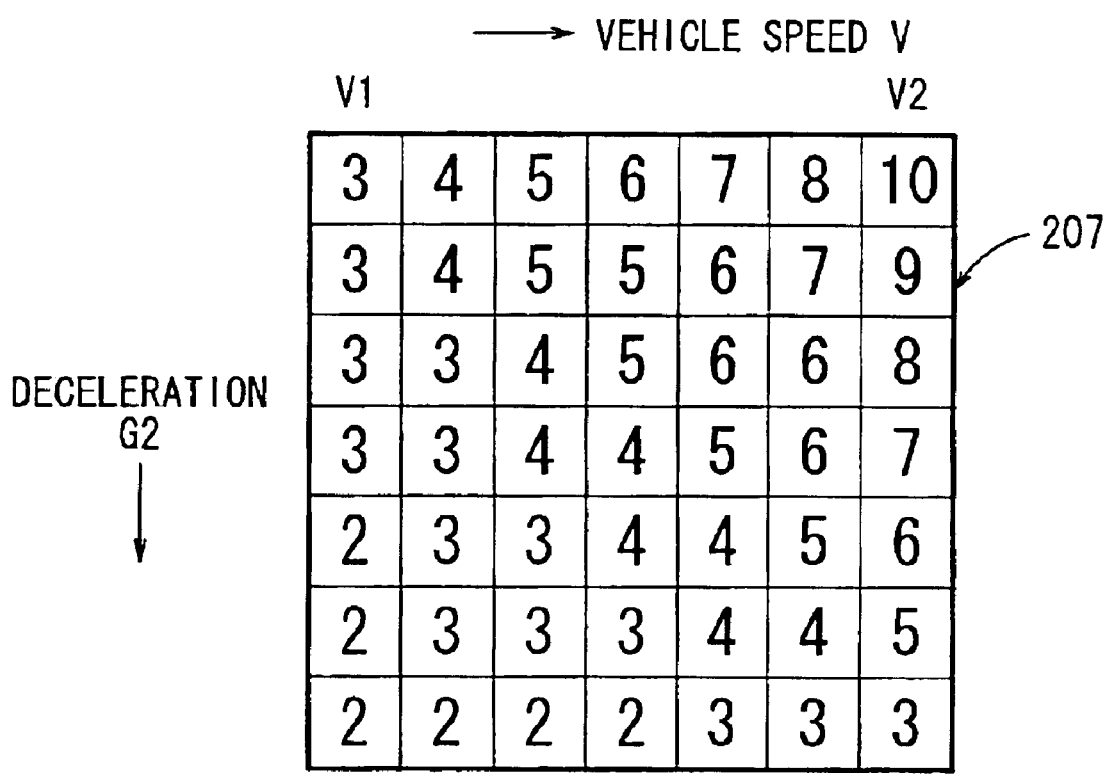
FIG. 20 is a diagram showing the contents of a map where time thresholds for engaging a clutch are recorded.

In step S1311, the main ECU 20 searches a map 207 shown in FIG. 20. The map 207 contains different time threshold values C0 for engaging the third clutch 46 that can be determined using vehicle speed values V and deceleration values G2 as parameters. The map 207 is established such that the time threshold C0 is greater as the vehicle speed V is higher, and the time threshold C0 is smaller as the deceleration G2 is greater. Therefore, as the deceleration G2 is greater and the vehicle speed V is closer to the vehicle speed threshold V1, the time threshold C0 is smaller and the time until the third clutch is engaged is shorter. Conversely, as the deceleration G2 is smaller and the vehicle speed V is closer to the vehicle speed threshold V2, the time threshold C0 is greater and the time until the third clutch is engaged is longer.

In step S1312, the main ECU 20 determines whether or not the value of the timer counter I is equal to or greater than the time threshold C0 to determine whether the third clutch 46 is to be engaged or not. If the value of the timer counter I is smaller than the time threshold C0, then the main EPU 20 puts the processing sequence to an end. If the value of the timer counter I is equal to or greater than the time threshold C0, then control goes to step S1313.

After step S1314, the main ECU 20 initializes the timer counter I to "0" in step S1315, and then puts the processing sequence to an end.

If the vehicle speed V exceeds the vehicle speed threshold V1 in step S1304, then the main ECU 20 determines whether the third clutch 46 is disengaged or not in step S1316. If the third clutch 46 is disengaged, then control goes to step S1313. If the third clutch 46 is engaged, then the main ECU 20 puts the processing sequence to an end.

According to the map 207 and the twelfth program, even if the vehicle speed V is the same, when the deceleration G2 is larger, the time threshold C0 becomes smaller, engaging the third clutch 46 earlier. Therefore, a feed-forward action is achieved. The third clutch 46 can thus reliably be engaged before the vehicle speed V is lowered than the vehicle speed threshold V1.

When the hybrid vehicle 12 is dramatically decelerated, the time threshold C0 becomes very small and lower than the value of the timer counter I, whereupon the third clutch 46 is immediately engaged.

Figure 21:
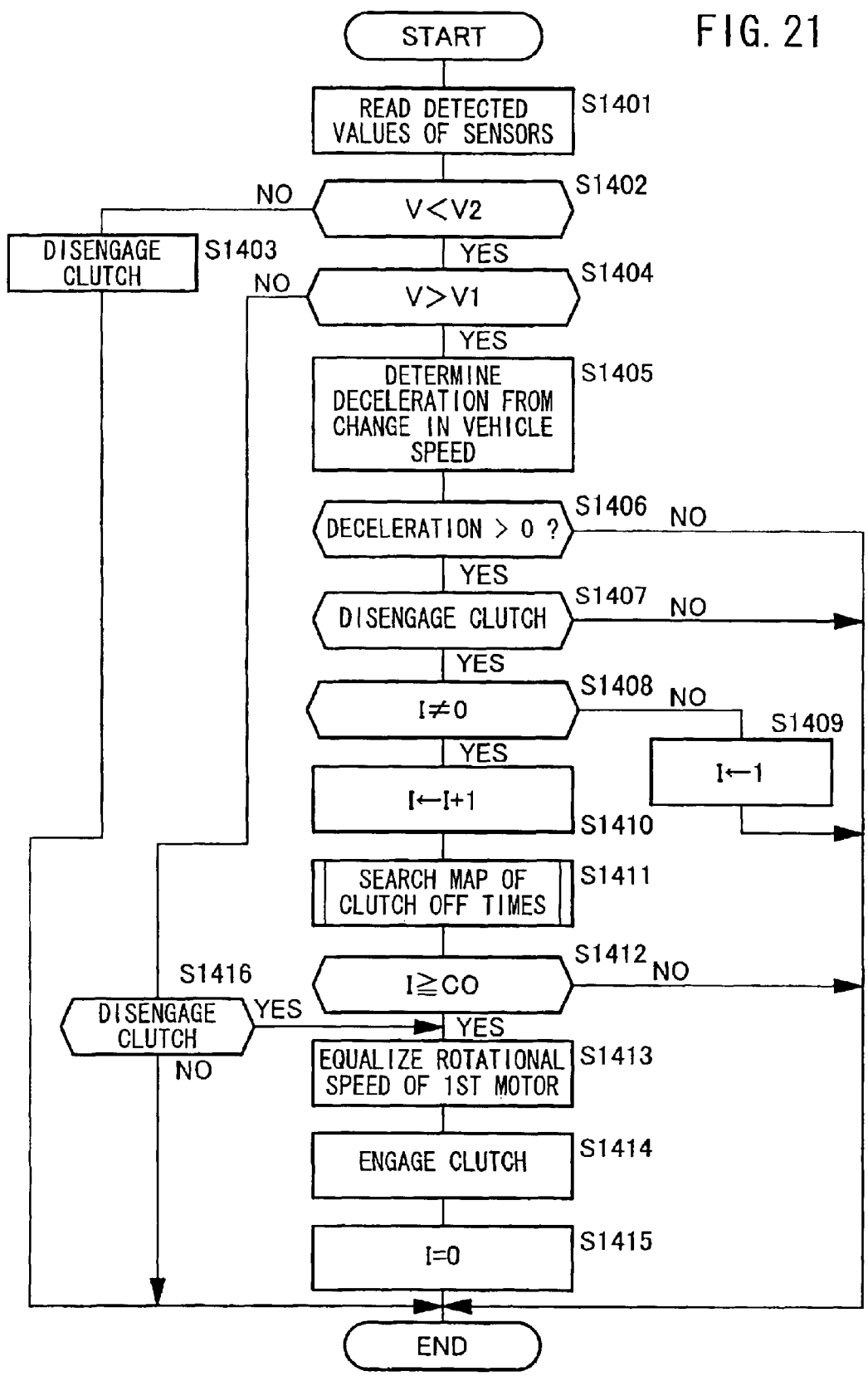
FIG. 21 is a flowchart of a processing sequence of the drive control apparatus according to a thirteenth program.

A processing sequence that is executed by the main ECU 20 based on the thirteenth program stored in the ROM will be described below with reference to FIG. 21. Steps S1401 through S1404 shown in FIG. 21 are identical to steps S1301 through S1304 shown in FIG. 19, and steps S1406 through S1416 shown in FIG. 21 are identical to steps S1306 through S1316 shown in FIG. 19. In step S1405, the main ECU 20 determines a deceleration G2 from the vehicle speed V in the present cycle and the vehicle speed $V_0$ in the preceding cycle. The thirteenth program offers the same advantages as the twelfth program, and makes it unnecessary to use the acceleration sensor 115.

Figure 22:
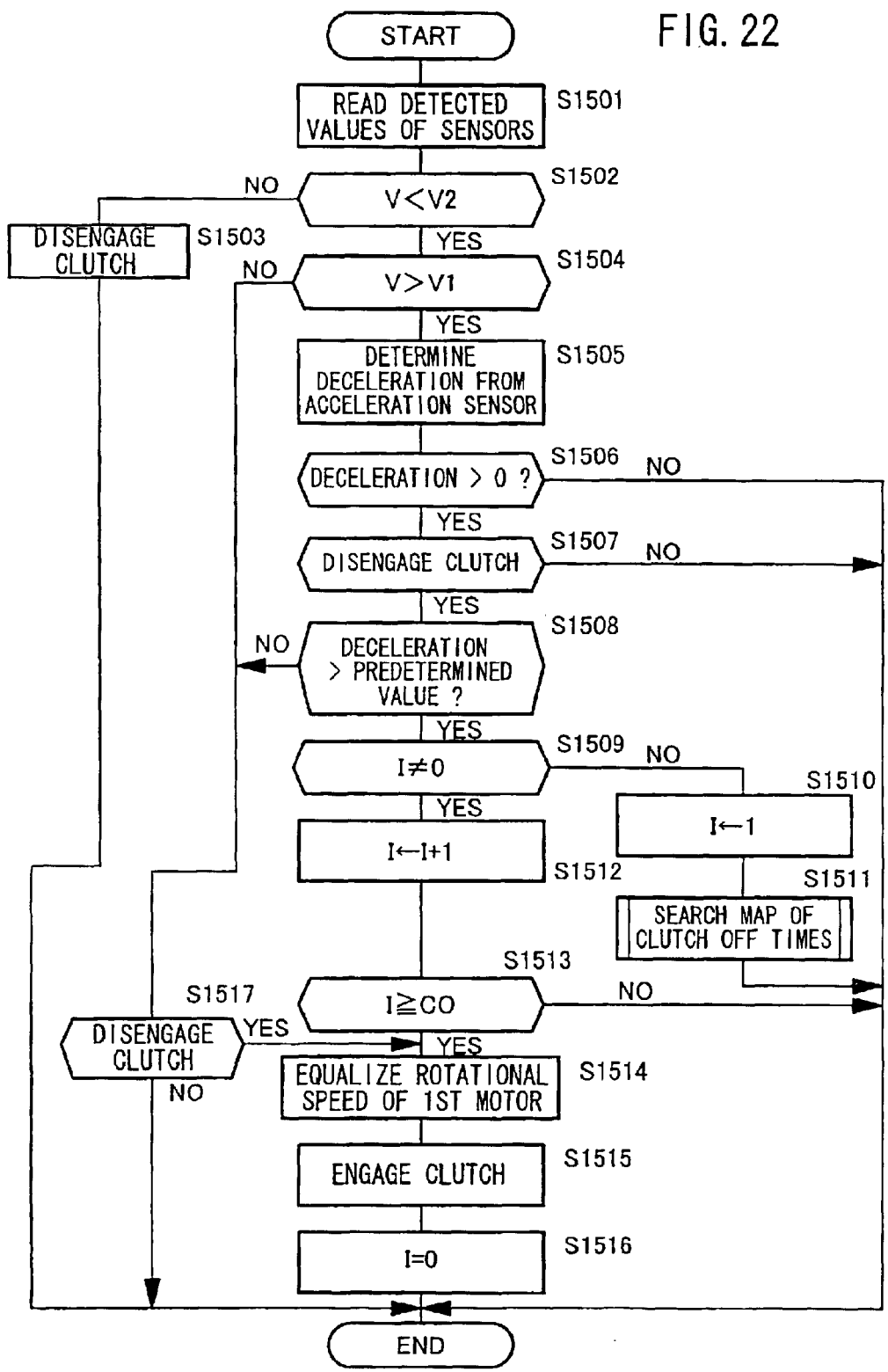
FIG. 22 is a flowchart of a processing sequence of the drive control apparatus according to a fourteenth program.

A processing sequence that is executed by the main ECU 20 based on the fourteenth program stored in the ROM will be described below with reference to FIG. 22. Steps S1501 through S1507 shown in FIG. 22 are identical to steps S1301 through S1307 shown in FIG. 19, and steps S1513 through S1517 shown in FIG. 22 are identical to steps S1312 through S1316 shown in FIG. 19. Steps S1509, S1510, S1511, S1512 shown in FIG. 22 are identical to steps S1308, S1309, S1311, S1310, respectively, shown in FIG. 19. The fourteenth program is different from the thirteenth program in that step S1508 is added and step S1511 for searching the map 207 (see FIG. 20) performs the search process only in a first cycle when the value of the timer counter I is "0".

After step S1507, the main ECU 20 compares the deceleration G2 with a predetermined value in step S1508. If the deceleration G2 is smaller than the predetermined value, then control goes to step S1509. If the deceleration G2 is equal to or greater than the predetermined value, then control goes to step S1517.

In step S1509, the main ECU 20 confirms the value of the timer counter I. If the value of the timer counter I is "0" then the main ECU 20 sets it to "1" in step S1510, and searches the map 207 to determine a time threshold C0 in step S1511. If the value of the timer counter I is other than "0", then the main ECU 20 counts up the timer counter I by setting it to I←I+1 in step S1512. Then, the main ECU 20 compares the value of the timer counter I with the time threshold C0 in step S1513 to determine whether the third clutch 46 is to be engaged or not.

According to the fourteenth program, when the hybrid vehicle 12 is slowly decelerated, the map 207 is brought into action in step S1513 for engaging the third clutch 46, and when the hybrid vehicle 12 is dramatically decelerated and the deceleration G2 is equal to or greater than the predetermined value, control goes from step S1508 to step S1517 regardless of the value of the timer counter I for engaging the third clutch 46. Therefore, the third clutch 46 can be engaged at an appropriate timing both when the hybrid vehicle 12 is slowly decelerated and when the hybrid vehicle 12 is quickly decelerated. Since the map 207 is searched only in a first cycle at the start of deceleration, the subsequent processing time of the main ECU 20 is short. When the deceleration G2 is greater, control branches from step S1508 for engaging the third clutch 46 regardless of the time threshold C0. Therefore, the third clutch 46 is engaged before the vehicle V becomes lower than the vehicle speed threshold V1.

Figure 23:
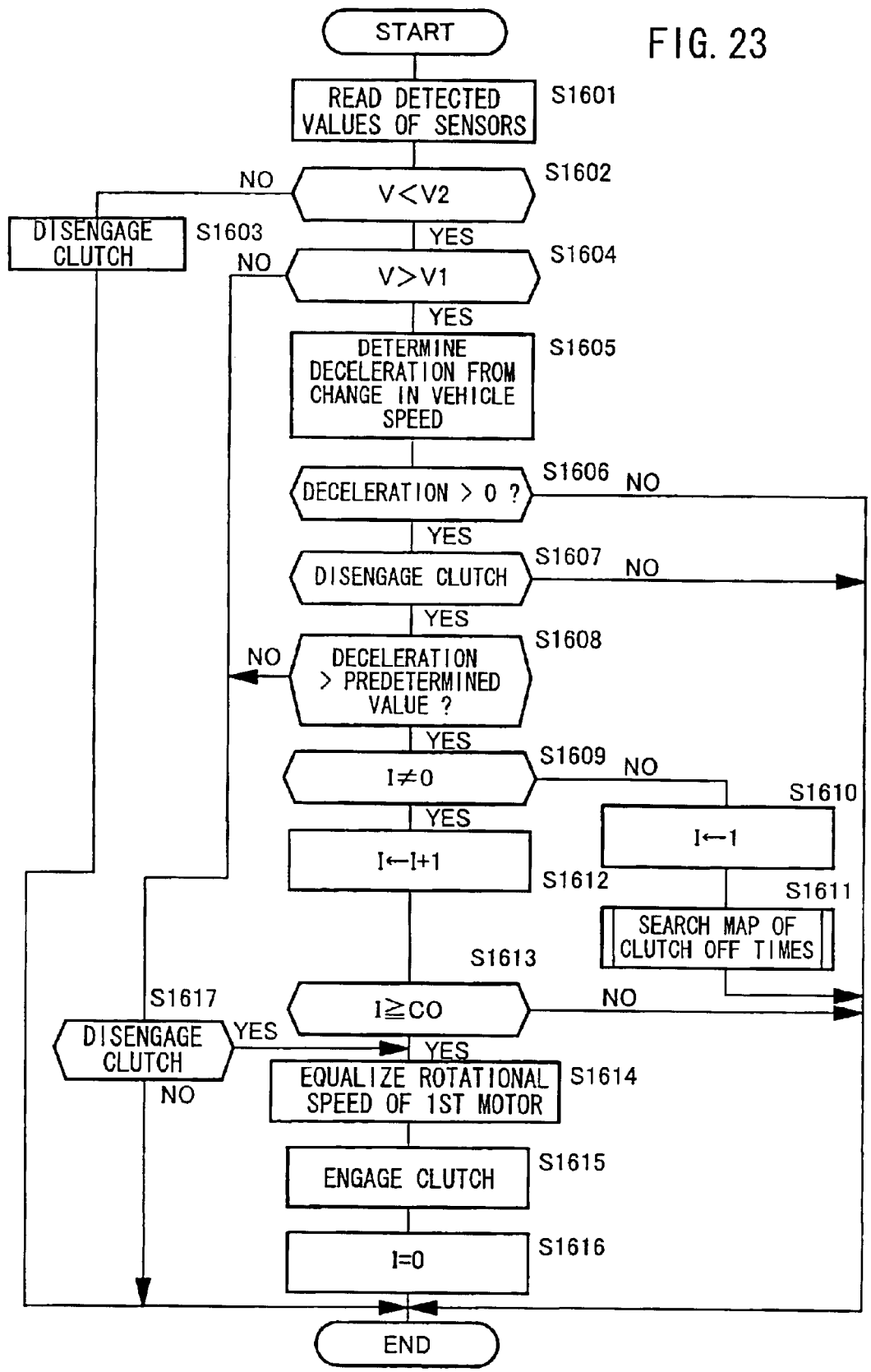
FIG. 23 is a flowchart of a processing sequence of the drive control apparatus according to a fifteenth program.

A processing sequence that is executed by the main ECU 20 based on the fifteenth program stored in the ROM will be described below with reference to FIG. 23. Steps S1601 through S1604 shown in FIG. 23 are identical to steps S1501 through S1504 shown in FIG. 22, and steps S1606 through S1617 shown in FIG. 23 are identical to steps S1506 through S1517 shown in FIG. 22. Step S1605 shown in FIG. 23 is identical to step S1105 shown in FIG. 17 for determining a deceleration G2 from the vehicle speed V in the present cycle and the vehicle speed $V_0$ in the preceding cycle. Therefore, there is no need to use the acceleration sensor 115.

Figure 24:
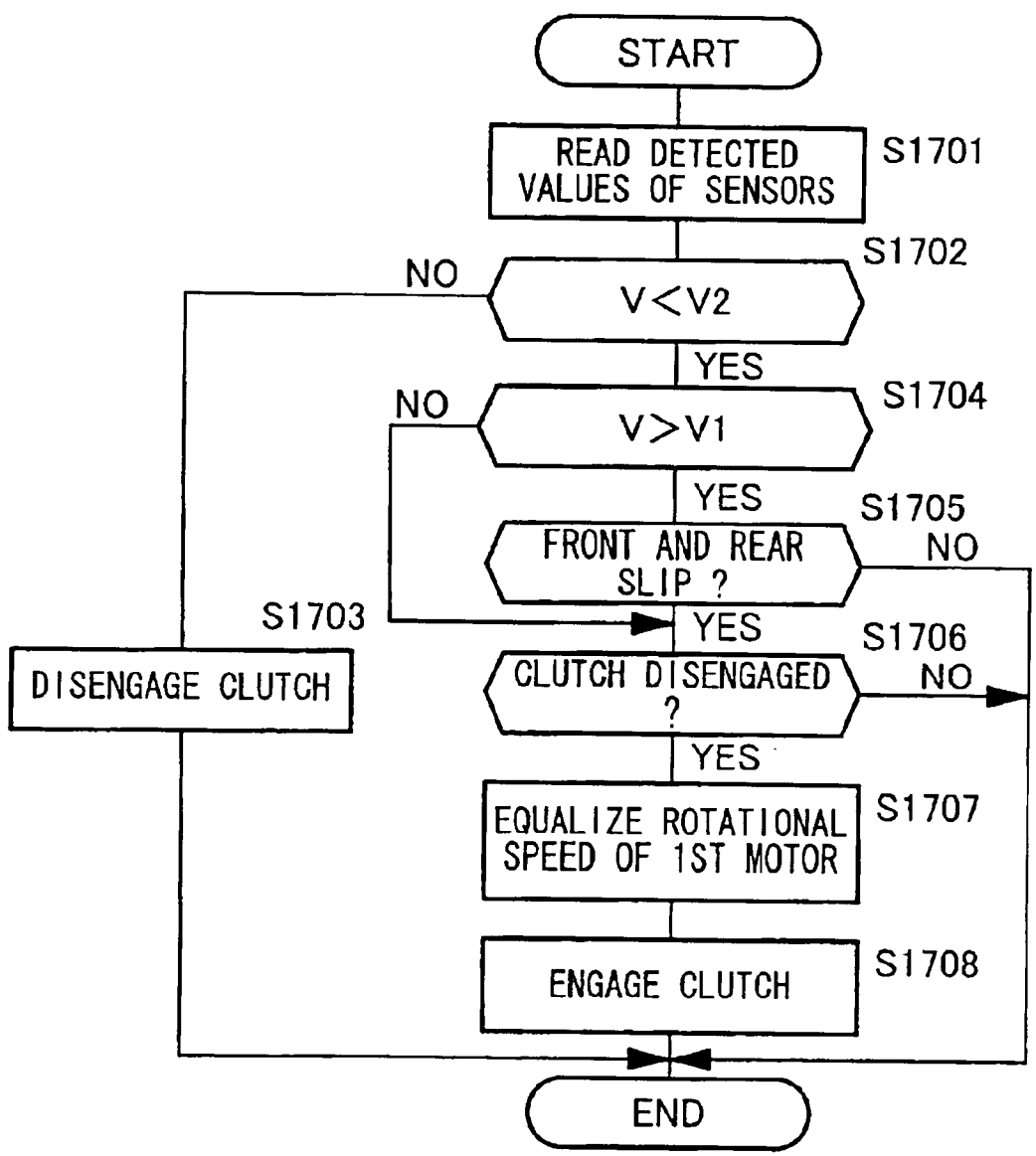
FIG. 24 is a flowchart of a processing sequence of the drive control apparatus according to a sixteenth program.

A processing sequence that is executed by the main ECU 20 based on the sixteenth program stored in the ROM will be described below with reference to FIG. 24. Steps S1701 through S1704 shown in FIG. 24 are identical to steps S1001 through S1004 shown in FIG. 16, and steps S1707, S1708 shown in FIG. 24 are identical to steps S1008, S1009 shown in FIG. 16.

After step S1704, the main ECU 20 confirms whether the hybrid vehicle 12 is causing a front slip or a rear slip or not in step S1705 (slip determining unit). If a front slip or a rear slip is occurring, then control goes to step S1706.

In step S1706, the main ECU 20 confirms whether the third clutch 46 is disengaged or not, as in step S1007 shown in FIG. 16. If the third clutch 46 is disengaged, then control goes to step S1707. If the third clutch 46 is engaged, then the main EPU 20 puts the processing sequence to an end.

In step S1707, the main ECU 20 equalizes the rotational speed of the first motor 16 to the rotational speed of the drive shaft 47. Then, the main ECU 20 engages the third clutch 46 in step S1708.

The front slip or rear slip is determined based on the absolute value of the difference between a wheel speed $V_{front}$ and a wheel speed $V_{rear}$. The wheel speed $V_{front}$ is calculated from the detected values of the vehicle speed sensors 50a, 50b, which detect the wheel speeds of the front wheels 26a, 26b. The wheel speed $V_{rear}$ is calculated from the detected values of the vehicle speed sensors 50c, 50d, which detect the wheel speeds of the rear wheels 27a, 27b. If the absolute value of the difference between the wheel speed $V_{front}$ and the wheel speed $V_{rear}$ is equal to or greater than a predetermined value, then since the rotational speeds of the front wheels 26a, 26b and the rear wheels 27a, 27b differ, it may be judged that either front wheels 26a, 26b or the rear wheels 27a, 27b are slipping, or are likely to slip.

Figure 25:
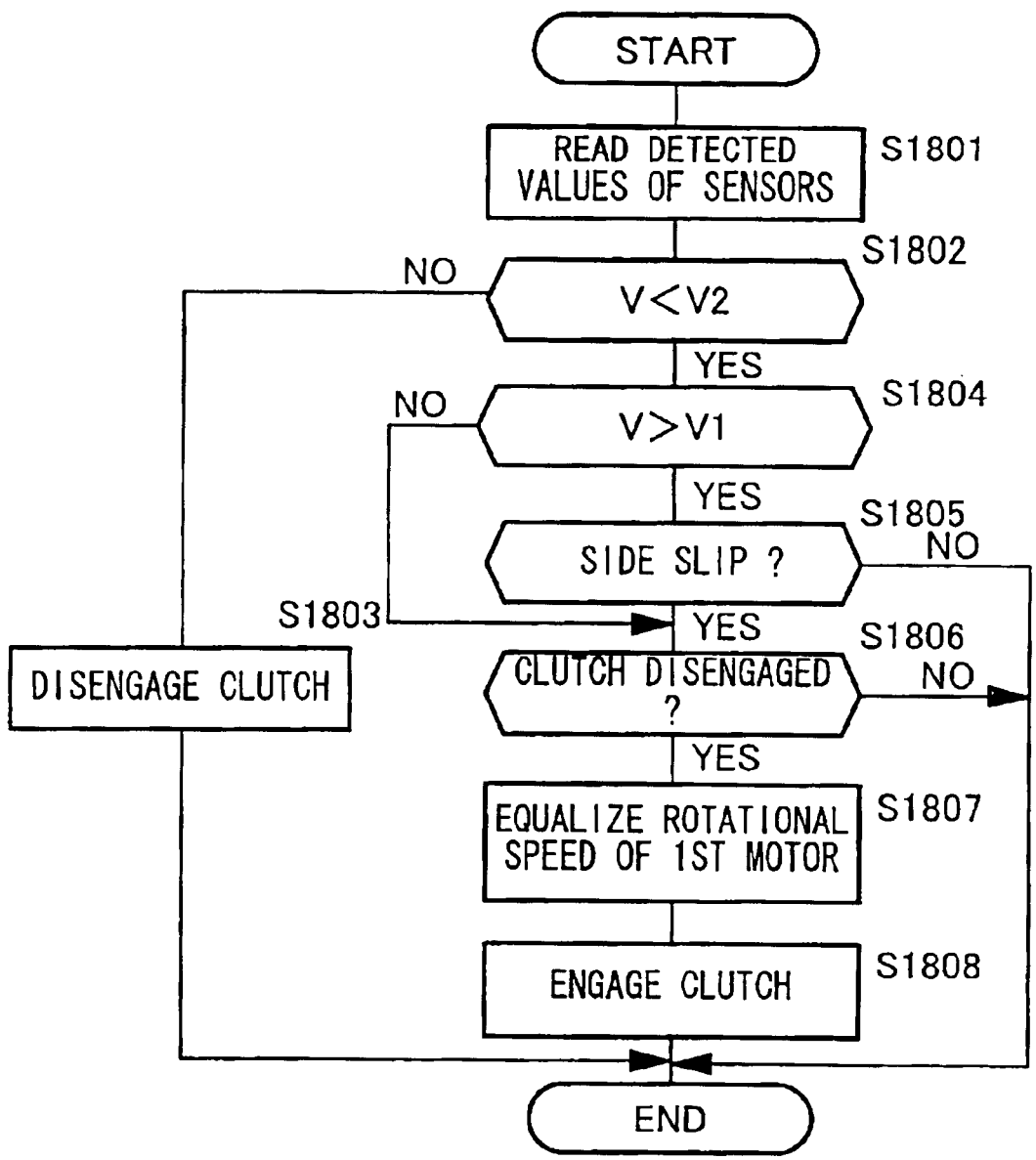
FIG. 25 is a flowchart of a processing sequence of the drive control apparatus according to a seventeenth program.

A processing sequence that is executed by the main ECU 20 based on the seventeenth program stored in the ROM will be described below with reference to FIG. 25. Steps S1801 through S1804 shown in FIG. 25 are identical to steps S1701 through S1704 shown in FIG. 24, and steps S1806 through S1808 shown in FIG. 25 are identical to steps S1706 through S1708 shown in FIG. 24.

After step S1804, the main ECU 20 confirms whether the hybrid vehicle 12 is causing a side slip or not in step S1805 (slip determining unit). If a side slip is occurring, then control goes to step S1806.

After having confirmed the disengagement of the third clutch 46 in step S1808, the main ECU 20 equalizes the rotational speed of the first motor 16 to the rotational speed of the drive shaft 47 in step S1807. Then, the main ECU 20 engages the third clutch 46 in step S1808.

The side slip is determined based on the absolute value of the difference between a wheel speed $V_{left}$ and a wheel speed $V_{right}$. The wheel speed $V_{left}$ is calculated from the detected values of the vehicle speed sensors 50a, 50c which detect the wheel speeds of the left front wheel 26a and the left rear wheel 27a. The wheel speed $V_{right}$ is calculated from the detected values of the vehicle speed sensors 50b, 50d which detect the wheel speeds of the right front wheels 26b and the right rear wheel 27b. If the absolute value of the difference between the wheel speed $V_{left}$ and the wheel speed $V_{right}$ is equal to or greater than a predetermined value, then since the rotational speeds of the left wheel 26a, 27a and the right wheels 26b, 27b differ, it may be judged that either the left wheel 26a, 27a or the right wheels 26b, 27b are slipping or likely to slip.

Figure 26:
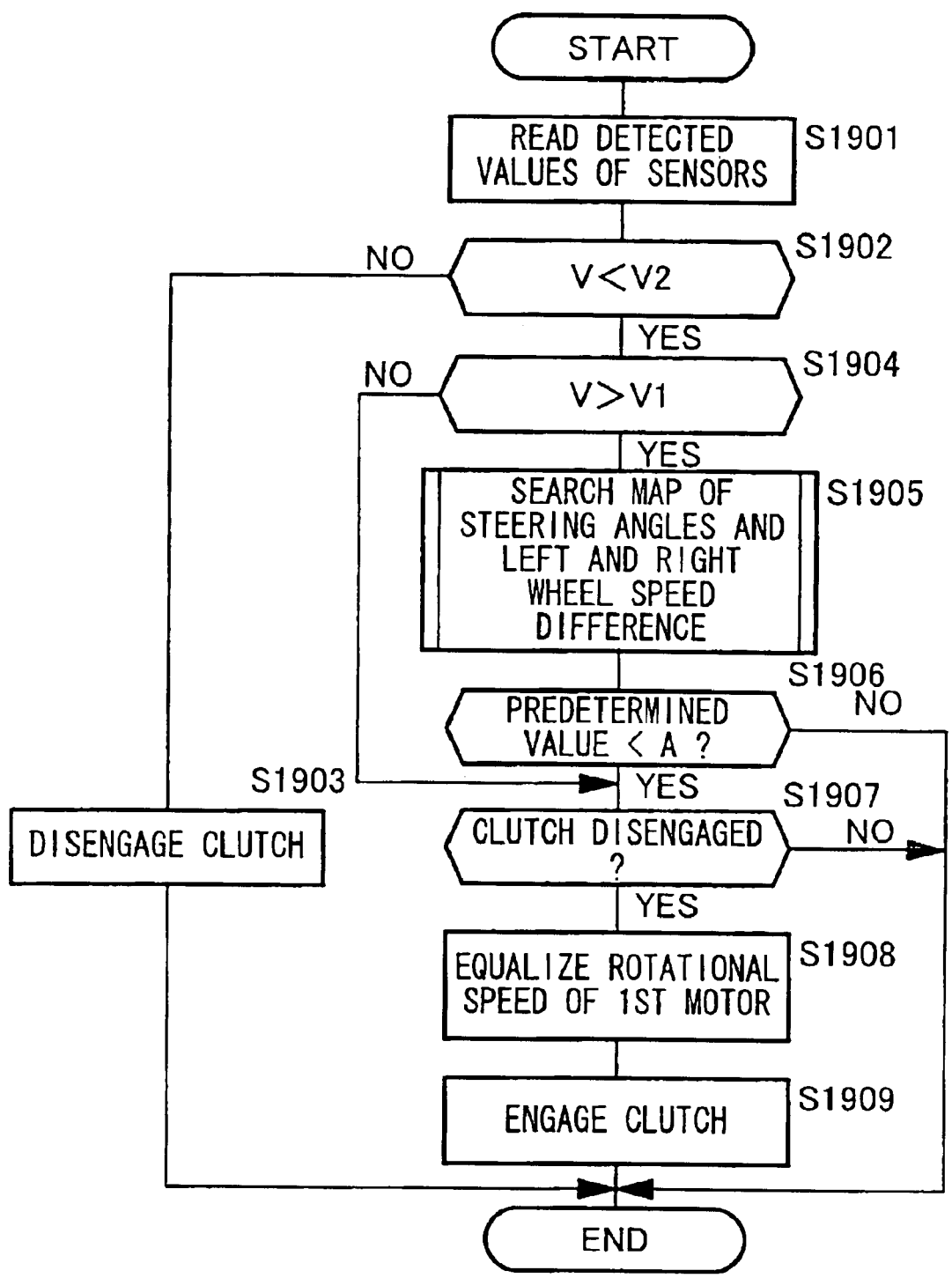
FIG. 26 is a flowchart of a processing sequence of the drive control apparatus according to an eighteenth program.

A processing sequence that is executed by the main ECU 20 based on the eighteenth program stored in the ROM will be described below with reference to FIGS. 26 and 27. Steps S1901 through S1904 shown in FIG. 26 are identical to steps S1701 through S1704 shown in FIG. 24, and steps S1907 through S1909 shown in FIG. 26 are identical to steps S1706 through S1708 shown in FIG. 24.

After step S1904, the main ECU 20 searches a map 208 shown in FIG. 27 in step S1905. The map 208 contains index values A for the possibility of a wheel turn at different steering angle values θ, and left and right wheel speed difference values. The map 208 is searched for index values A using steering angle values θ, and left and right wheel speed difference values as parameters. The left and right wheel speed difference may be determined in the same manner as with step S1805 shown in FIG. 25.

The index A for the possibility of a wheel turn is established so as to be greater as the steering angle θ, and the left and right wheel speed difference are greater. The index A may be determined by calculations, an analysis, an experiment, or the like.

In step S1906 (slip determining unit), the main ECU 20 compares the index A with a predetermined value. If the index A is greater than the predetermined value, then the main ECU 20 can judge that the hybrid vehicle 12 is slipping or is likely to slip. Then, control goes to step S1907.

According to the sixteenth through eighteenth programs, when the hybrid vehicle 12 is suffering a front slip or a rear slip, a side slip, or a wheel turn, the third clutch 46 is engaged, immediately bringing the hybrid vehicle 12 into the four-wheel-drive mode to prevent the wheels from rotating idly, i.e., to prevent the hybrid vehicle 12 from being stuck, or to allow an ABS (Antiskid Brake System) of the hybrid vehicle 12 to function more effectively.

Figure 28:
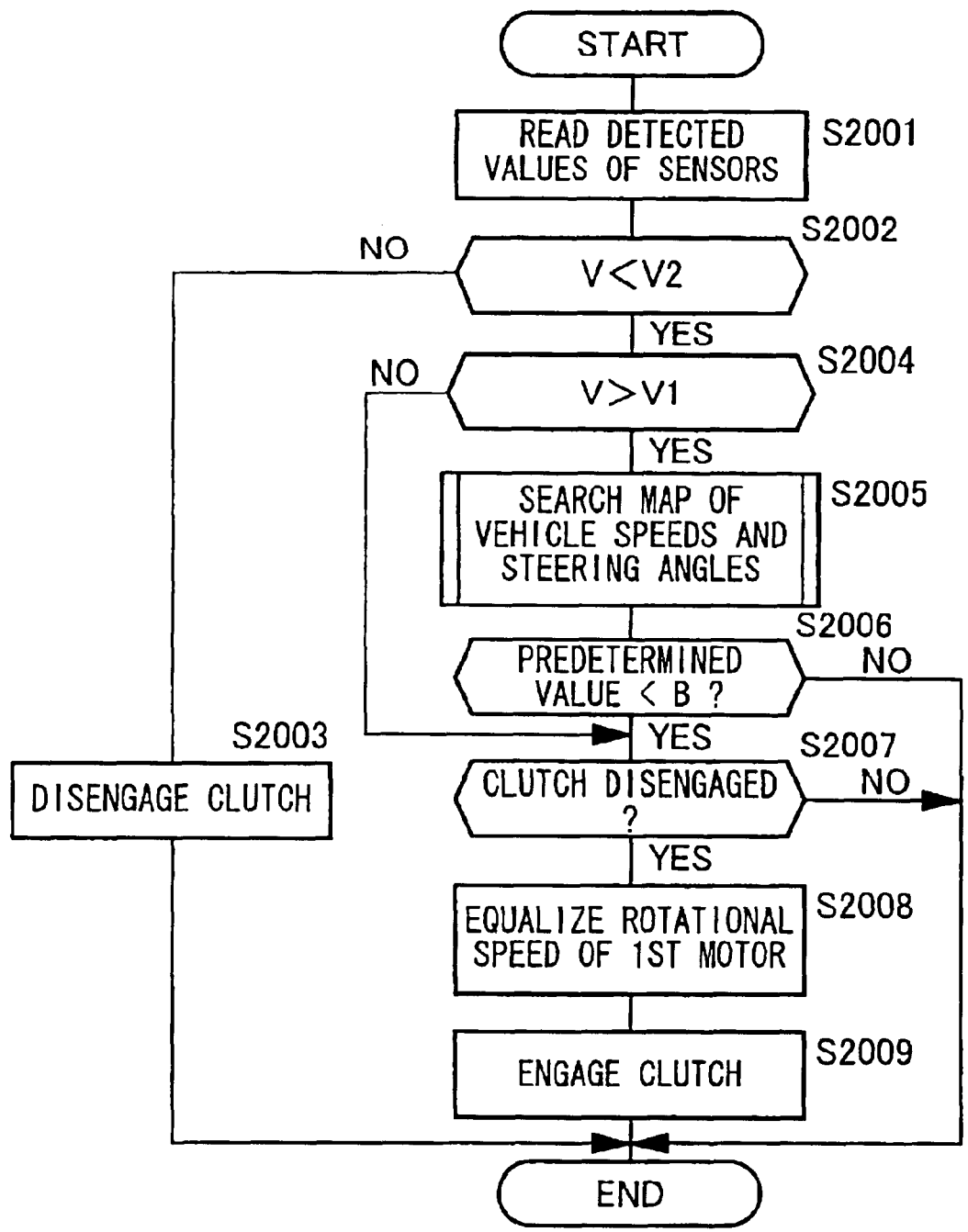
FIG. 28 is a flowchart of a processing sequence of the drive control apparatus according to a nineteenth program.

A processing sequence that is executed by the main ECU 20 based on the nineteenth program stored in the ROM will be described below with reference to FIGS. 28 and 29. Steps S2001 through S2004 shown in FIG. 28 are identical to steps S1701 through S1704 shown in FIG. 24, and steps S2007 through S2009 shown in FIG. 28 are identical to steps S1706 through S1708 shown in FIG. 24.

After step S2004, the main ECU 20 searches a map 210 shown in FIG. 29 in step S2005. The map 208 contains index values B for the possibility of a vehicle behavior disturbance at different vehicle speed values V and steering angle values θ. The map 208 is searched for index values B using steering angle values θ and left and right wheel speed difference values as parameters. The map 210 may additionally contain, as other parameters, lateral acceleration values that are determined by a sensor or a calculation.

The vehicle behavior disturbance may include an oversteer phenomenon in a front-wheel-drive mode and an understeer phenomenon in the front-wheel-drive mode. The oversteer phenomenon in the front-wheel-drive mode occurs when the front wheels 26a, 26b are steered through too a large angle with respect to the steering direction, so that the vehicle tends to be oriented inwardly of the turning circle. The understeer phenomenon in the front-wheel-drive mode occurs when the drive power applied to the front wheels 26a, 26b is too large for the steering angle, causing the front wheels 26a, 26b to lose gripping forces and turn on an excessively large circle.

The index B for the possibility of a vehicle behavior disturbance is established so as to be greater as the vehicle speed V and the steering angle θ are greater. The index B may be determined by calculations, an analysis, an experiment, or the like.

In step S2006 (slip determining unit), the main ECU 20 compares the index B with a predetermined value. If the index B is greater than the predetermined value, then the main ECU 20 can judge that the hybrid vehicle 12 is slipping or is likely to slip. Then, control goes to step S2007.

Using the map 210, the main ECU 20 determines a slip of the front wheels 26a, 26b and the rear wheels 27a, 27b, and engages the third clutch 46 before a vehicle behavior disturbance occurs. When a vehicle behavior disturbance actually occurs, a predetermined vehicle behavior stabilizing control process can immediately be performed. The vehicle behavior stabilizing control process may be a VSA (Vehicle Stability Assist) process, a TCS (Traction Control System) process, or the like. According to the VSA or TCS process, which will not be described in detail, drive power or brake power applied to the front wheels 26a, 26b and the rear wheels 27a, 27b is individually controlled for stabilizing the vehicle behavior.

A processing sequence that is executed by the main ECU 20 based on the twentieth program stored in the ROM will be described below with reference to FIG. 30. Steps S2101 through S2104 shown in FIG. 30 are identical to steps S1701 through S1704 shown in FIG. 24, and steps S2106 through S2108 shown in FIG. 30 are identical to steps S1706 through S1708 shown in FIG. 24.

After step S2104, the main ECU 20 compares the steering angle θ with a predetermined value in step S2105 (slip determining unit). If the steering angle θ is greater than the predetermined value, then the ECU 20 can judge that the hybrid vehicle 12 is slipping or is likely to slip. Then, control goes to step S2106.

As described above, when the steering angle θ is greater than the predetermined value, the third clutch 46 is engaged to immediately perform a vehicle behavior stabilizing control process. Since the main ECU 20 does not refer to the map 210 (FIG. 29) or the like, the processing sequence shown in FIG. 30 is quick and simple.

According to the twentieth program, the main ECU 20 does not take the vehicle V into account in step S2105 for determining whether the third clutch 46 is to be connected or not. However, it is clear that V1<V<V2 from steps S2102 and S2104, and the predetermined value used in step S2105 may be set based on the vehicle speed thresholds V1, V2.

The ninth through twentieth programs for controlling the timing to engage the third clutch 46 have been described above. These programs may be executed in any desired combinations. For example, the ninth program (see FIG. 16) and the sixteenth program (see FIG. 24) may be executed in combination to engage the third clutch 46 before the vehicle speed V becomes lower than the vehicle speed threshold V1 and also to engage the third clutch 46 when the hybrid vehicle 12 has slipped.

The maps 206, 207, 208 may be replaced with equations based on the respective parameters for calculating values corresponding to the values contained in the maps.

Although certain preferred embodiments of the present invention have been shown and described in detail it should be understood that various changes and modifications may be made therein without departing from the scope of the appended claims.

What is claimed is:

1. A drive control apparatus for a hybrid vehicle having front and rear wheels, an engine for driving one of the front and rear wheels, and a motor for driving the other of the front and rear wheels, comprising:

a clutch for selectively connecting and disconnecting said motor to and from a drive shaft;

a torque controller for controlling torque of said motor;

a speed detector for detecting a vehicle speed of the hybrid vehicle; and a clutch controller for determining a timing to engage or disengage said clutch and operating said clutch at the determined timing;

wherein when the hybrid vehicle increases in speed, said torque controller gradually reduces the torque of said motor based on said vehicle speed, and the torque of said motor is reduced to zero when said vehicle speed reaches a predetermined vehicle speed threshold, and said clutch controller disengages said clutch at least when said vehicle speed reaches said vehicle speed threshold.

2. A drive control apparatus according to claim 1, further comprising:

a drive circuit for energizing said motor; and a battery for supplying electric power to said motor;

said vehicle speed threshold including a first vehicle speed threshold and a second vehicle speed threshold which is greater than said first vehicle speed threshold;

wherein said clutch controller disengages said clutch based on the state of said motor, said drive circuit and/or said battery when said vehicle speed falls in a range between said first vehicle speed threshold and said second vehicle speed threshold, and said clutch controller disengages said clutch irrespective of said state when said vehicle speed is equal to or greater than said second vehicle speed threshold.

3. A drive control apparatus according to claim 2, further comprising:

a temperature detector for detecting the temperature of said motor, said drive circuit and/or said battery; and a timer function unit;

wherein said timer function unit starts measuring time when said vehicle speed reaches said first vehicle speed threshold, said clutch controller sets a time to disengage said clutch based on the temperature of said motor, said drive circuit and/or said battery, and said vehicle speed, and disengages said clutch if the time measured by said timer function unit reaches said time to disengage said clutch.

4. A drive control apparatus according to claim 2, wherein said clutch controller disengages said clutch if said hybrid vehicle is running stably when said vehicle speed falls in a range between said first vehicle speed threshold and said second vehicle speed threshold.

5. A drive control apparatus according to claim 4, wherein said hybrid vehicle is running stably if a change in said vehicle speed per a predetermined time is equal to or smaller than a predetermined value.

6. A drive control apparatus according to claim 2, further comprising:
a temperature detector for detecting the temperature of said motor, said drive circuit and/or said battery; and
a timer function unit;
wherein said clutch controller disengages said clutch if the temperature detected by said temperature detector is equal to or greater than a predetermined temperature and continues to be equal to or greater than said predetermined temperature as detected by said timer function unit, when said vehicle speed falls in a range between said first vehicle speed threshold and said second vehicle speed threshold.

7. A drive control apparatus according to claim 2, further comprising:
a temperature detector for detecting the temperature of said motor, said drive circuit and/or said battery;
wherein said clutch controller disengages said clutch if a rate of change of the temperature which is calculated based on a detected value of said temperature detector is equal to or greater than a predetermined threshold, when said vehicle speed falls in a range between said first vehicle speed threshold and said second vehicle speed threshold.

8. A drive control apparatus according to claim 2, further comprising:
a temperature detector for detecting the temperature of said motor, said drive circuit and/or said battery; and
a cooling device for cooling said motor, said drive circuit and/or said battery when the temperature of said motor, said drive circuit and/or said battery is equal to or greater than a predetermined operation start temperature;
wherein said clutch controller disengages said clutch if the temperature detected by said temperature detector is equal to or lower than a threshold temperature which is lower than said operation start temperature, when said vehicle speed falls in a range between said first vehicle speed threshold and said second vehicle speed threshold.

9. A drive control apparatus according to claim 2, wherein said clutch controller calculates an amount of heat generated by said motor and disengages said clutch if an accumulative sum of said amount of heat reaches a predetermined amount-of-heat threshold, when said vehicle speed falls in a range between said first vehicle speed threshold and said second vehicle speed threshold.

10. A drive control apparatus according to claim 2, further comprising:
a state-of-charge detector for detecting state of charge of said battery;
wherein said clutch controller disengages said clutch if said state of charge is equal to or smaller than a first state-of-charge threshold or equal to or greater than a second state-of-charge threshold which is greater than said first state-of-charge threshold, when said vehicle speed falls in a range between said first vehicle speed threshold and said second vehicle speed threshold.

11. A drive control apparatus according to claim 2, further comprising:
a state-of-charge detector for detecting a state of charge stored in said battery;
wherein said clutch controller disengages said clutch if a rate of change of said state of charge is equal to or greater than a predetermined threshold, when said vehicle speed falls in a range between said first vehicle speed threshold and said second vehicle speed threshold.

12. A drive control apparatus according to claim 2, wherein said clutch controller calculates a time in which said vehicle speed is equal to or greater than said first vehicle speed threshold and disengages said clutch if said time reaches a predetermined time threshold, when said vehicle speed falls in a range between said first vehicle speed threshold and said second vehicle speed threshold.

13. A drive control apparatus according to claim 1, further comprising:
a deceleration detector for detecting a deceleration of said hybrid vehicle;
wherein said clutch controller engages said clutch if said deceleration is greater than a predetermined deceleration threshold while said clutch is being disengaged.

14. A drive control apparatus according to claim 13, wherein said clutch controller engages said clutch if said vehicle speed becomes lower than said vehicle speed threshold while said clutch is being disengaged.

15. A drive control apparatus according to claim 1, further comprising:
a shifting action detector for detecting a shifting action of a transmission mounted on said hybrid vehicle;
wherein said clutch controller engages said clutch if said shifting action detector detects a shift-down action while said clutch is being disengaged.

16. A drive control apparatus according to claim 1, further comprising:
a deceleration detector for detecting a deceleration of said hybrid vehicle; and
a timer function unit;
wherein said timer function unit starts measuring time when said speed detector detects said hybrid vehicle as being decelerated while said clutch is being disengaged, said timer function unit updates a time to engage said clutch based on said vehicle speed and/or said deceleration while said hybrid vehicle is being decelerated, and said clutch controller engages said clutch if the time measured by said timer function unit reaches said time to engage said clutch.

17. A drive control apparatus according to claim 1, further comprising:
a deceleration detector for detecting a deceleration of said hybrid vehicle; and
a timer function unit;
wherein said clutch controller sets a time to engage said clutch based on said vehicle speed and/or said deceleration while said clutch is being disengaged, said timer function unit starts measuring time when said deceleration is equal to or greater than a predetermined value, and said clutch controller engages said clutch if the time measured by said timer function unit reaches said time to engage said clutch or said deceleration is equal to or greater than said predetermined value.

18. A drive control apparatus according to claim 1, further comprising:

a slip determining unit for judging that a wheel is slipping or likely to slip;

wherein said clutch controller engages said clutch if said slip determining unit judges that said wheel is slipping or likely to slip while said clutch is being disengaged.

19. A drive control apparatus according to claim 18, wherein said slip determining unit judges that said wheel is slipping or likely to slip, based on the difference between wheel speeds of said front and rear wheels.

20. A drive control apparatus according to claim 18, wherein said slip determining unit judges that said wheel is slipping or likely to slip, based on the difference between wheel speeds of left and right front wheels, or left and right rear wheels.

21. A drive control apparatus according to claim 18, further comprising:

a steering wheel detector for detecting a steering angle of a steering wheel of said hybrid vehicle;

wherein said slip determining unit judges that said wheel is slipping or likely to slip, based on said vehicle speed and said steering angle.

22. A drive control apparatus according to claim 18, further comprising:

a steering wheel detector for detecting a steering angle of a steering wheel of said hybrid vehicle;

wherein said slip determining unit judges that said wheel is slipping or likely to slip, based on the difference between wheel speeds of left and right front wheels, or left and right rear wheels, and said steering angle.

* * * * *